United States Patent
Muto et al.

(10) Patent No.: US 7,195,007 B2
(45) Date of Patent: Mar. 27, 2007

(54) APPARATUS FOR CALCULATING AMOUNT OF RECIRCULATED EXHAUST GAS FOR INTERNAL COMBUSTION ENGINE

(75) Inventors: Harufumi Muto, Aichi-ken (JP); Daisuke Kobayashi, Toyota (JP); Yuichiro Ido, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 37 days.

(21) Appl. No.: 10/539,069

(22) PCT Filed: Dec. 8, 2003

(86) PCT No.: PCT/JP03/15660

§ 371 (c)(1), (2), (4) Date: Oct. 17, 2005

(87) PCT Pub. No.: WO2004/055343

PCT Pub. Date: Jul. 1, 2004

(65) Prior Publication Data

US 2007/0016358 A1    Jan. 18, 2007

(30) Foreign Application Priority Data

Dec. 17, 2002  (JP)  ............................. 2002-365631

(51) Int. Cl.
F02M 25/07  (2006.01)
F02B 47/08  (2006.01)

(52) U.S. Cl. ........................ 123/568.22; 123/568.11; 73/118.2

(58) Field of Classification Search ........... 123/568.11, 123/568.22, 568.18, 568.21, FOR. 124; 73/117.2, 73/117.3, 118.2; 60/605.2
See application file for complete search history.

(56) References Cited

U.S. PATENT DOCUMENTS

| | | | |
|---|---|---|---|
| 5,505,174 A | 4/1996 | Komoriya et al. | |
| 5,791,319 A | 8/1998 | Friedrich et al. | |
| 6,497,214 B2 | 12/2002 | Yagi | |
| 6,571,767 B2 | 6/2003 | Kabayashi et al. | |
| 6,711,490 B2 | 3/2004 | Kabayashi et al. | |
| 6,840,235 B2 * | 1/2005 | Koseki et al. | 123/568.14 |
| 6,856,890 B2 * | 2/2005 | Muto et al. | 701/108 |
| 6,879,904 B2 * | 4/2005 | Muto et al. | 701/108 |

(Continued)

FOREIGN PATENT DOCUMENTS

DE    3503798 A1    8/1986

(Continued)

*Primary Examiner*—Mahmoud Gimie
(74) *Attorney, Agent, or Firm*—Oliff & Berridge, PLC

(57) ABSTRACT

An intake pipe downstream of a throttle valve is interconnected with an exhaust pipe via an EGR supply pipe and an EGR control valve is disposed in the EGR supply pipe. An engine load ratio (KLoff) in the engine steady operation with the EGR gas being not supplied, and another engine load ratio KLon in the engine steady operation with the EGR gas being supplied are expressed with respective linear functions of an intake pipe pressure (Pm) and stored in advance. The intake pipe pressure (Pm) is detected, KLoff and KLon are calculated from the detected intake pipe pressure (Pm) using the linear function expressions and, then, a difference between these values ΔKL (=KLoff−KLon) is calculated. Based on the difference (ΔKL), the EGR control valve passing-through gas amount, which is an amount of the EGR gas passing through the EGR control valve, is calculated.

20 Claims, 20 Drawing Sheets

U.S. PATENT DOCUMENTS 7,146,268 B2 * 12/2006 Wild et al. .................. 701/107
2001/0029935 A1 * 10/2001 Cook .................... 123/568.27

FOREIGN PATENT DOCUMENTS

| EP | 0 485 089 A2 | 5/1992 |
| EP | 0 791 736 A2 | 8/1997 |
| JP | A 8-128359 A | 5/1996 |
| JP | A 2001-41095 A | 2/2001 |
| JP | A 2002-130039 A | 5/2002 |
| JP | A 2002-147279 A | 5/2002 |
| JP | A 2002-180877 A | 6/2002 |
| JP | A 2002-201998 A | 7/2002 |

* cited by examiner

Pe: EXHAUST PRESSURE (kPa)
Te: EXHAUST GAS TEMPERATURE (K)
Pm: INTAKE PIPE PRESSURE (kPa)
megr: FLOW RATE OF GAS PASSING THROUGH EGR CONTROL VALVE (g/sec)
Ae: CROSS SECTIONAL AREA OF OPENING OF EGR CONTROL VALVE (m²)

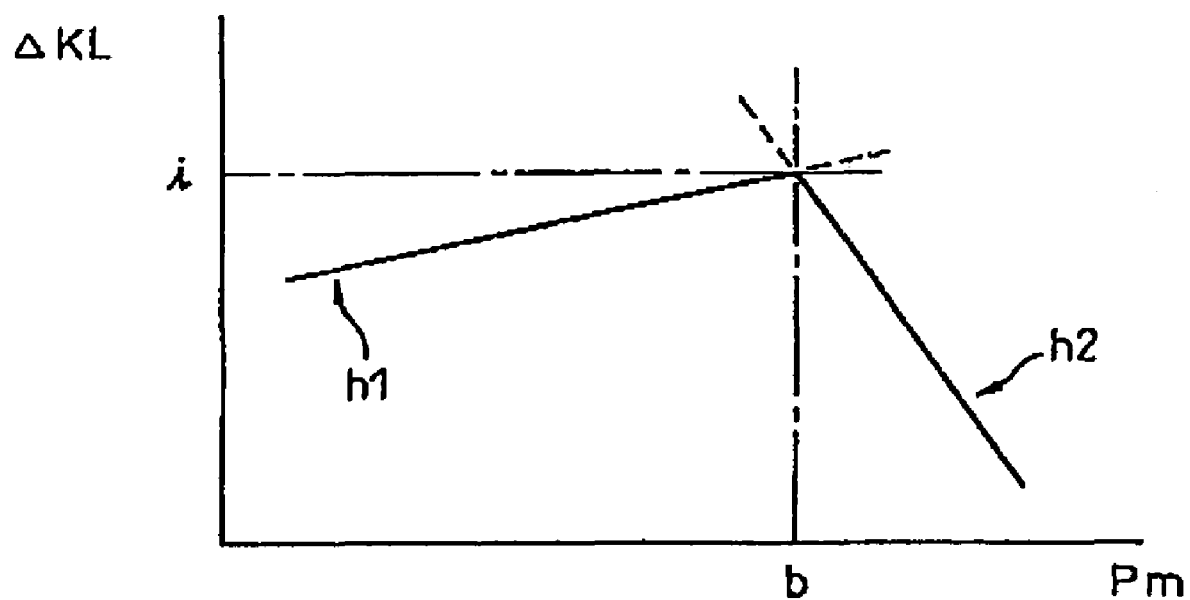

Fig.16A

STP
$h1^*_{11}$  $h1^*_{12}$  ----  $h1^*_{1n}$
$h1^*_{21}$
⋮                          ⋮
$h1^*_{m1}$  --------  $h1^*_{mn}$
                              NE

Fig.16B

STP
$h2^*_{11}$  $h2^*_{12}$  ----  $h2^*_{1n}$
$h2^*_{21}$
⋮                          ⋮
$h2^*_{m1}$  --------  $h2^*_{mn}$
                              NE

Fig.16C

STP
$i^*_{11}$  $i^*_{12}$  -----  $i^*_{1n}$
$i^*_{21}$
⋮                          ⋮
$i^*_{m1}$  --------  $i^*_{mn}$
                              NE

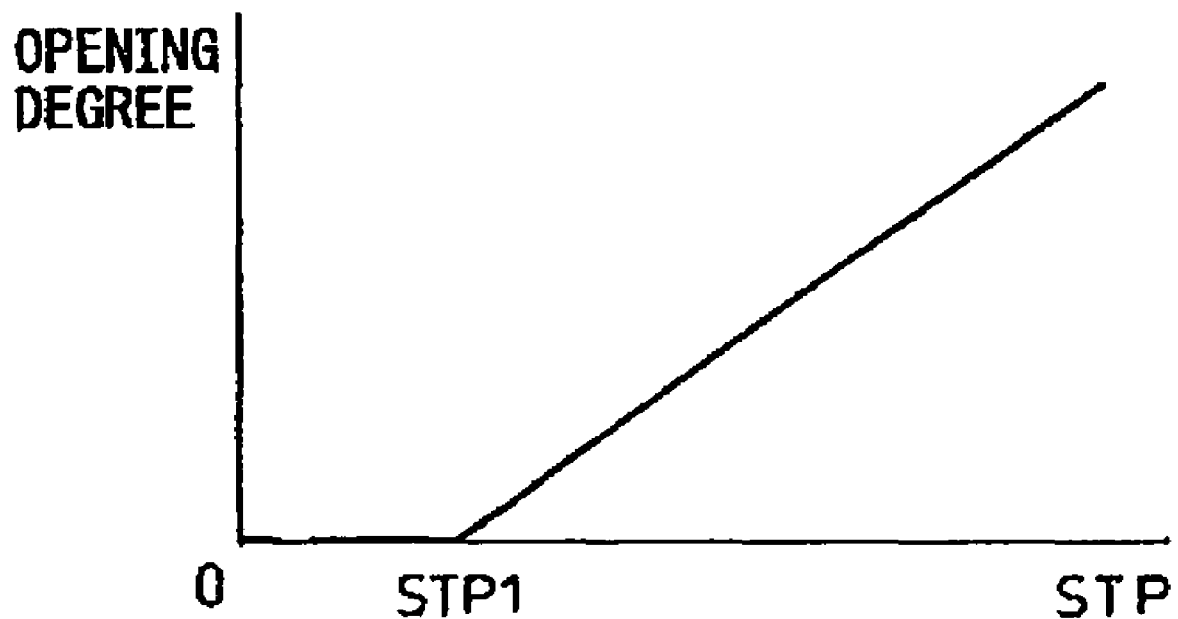

US 7,195,007 B2

APPARATUS FOR CALCULATING AMOUNT OF RECIRCULATED EXHAUST GAS FOR INTERNAL COMBUSTION ENGINE

FIELD OF THE INVENTION

The present invention relates to an apparatus for calculating an amount of a recirculated exhaust gas for an internal combustion engine.

BACKGROUND ART

Conventionally, there is known an internal combustion engine in which an intake pipe downstream of a throttle valve and an exhaust pipe are connected with each other via an exhaust gas recirculation passage and an exhaust gas recirculation control valve, for controlling an amount of recirculated exhaust gas flowing through the exhaust gas recirculation passage, is disposed in the exhaust gas recirculation passage.

In such an engine, in order to make an air-fuel ratio accurately equal to a target air-fuel ratio, it is necessary to obtain an amount of fresh air charged in a cylinder, i.e., a cylinder-charged air amount, accurately.

Thus, there is publicly known an internal combustion engine in which a model is built while taking account of both an amount of fresh air passing through the throttle valve and then flowing into the intake pipe, i.e., a throttle valve passing-through air amount, and an amount of the recirculated exhaust gas passing through the exhaust gas recirculation control valve and flowsing into the intake pipe, i.e., an exhaust gas recirculation control valve passing-through gas amount, and the cylinder-charged air amount is calculated using this model (see Japanese Unexamined Patent Publication (Kokai) No. 2002-147279).

However, in this Publication, there is no specific description regarding how to obtain the amount of the recirculated exhaust gas passing through the exhaust gas recirculation control valve.

DISCLOSURE OF THE INVENTION

Therefore, it is an object of the present invention to provide an apparatus for calculating an amount of a recirculated exhaust gas for an internal combustion engine which can provide the exhaust gas recirculation control valve passing-through gas amount, simply and accurately.

According to the present invention, there is provided an apparatus for calculating an amount of a recirculated exhaust gas for an internal combustion engine, in which an intake pipe downstream of an throttle valve and an exhaust pipe are connected with each other via an exhaust gas recirculation passage, and an exhaust gas recirculation control valve for controlling an amount of recirculated exhaust gas flowing through the exhaust gas recirculation passage is disposed in the exhaust gas recirculation passage, the apparatus comprising: means for expressing a difference between a cylinder-charged air amount in a steady engine operation with the recirculated exhaust gas being not supplied, and the cylinder-charged air amount in the engine steady operation with the recirculated exhaust gas being supplied, with a function expression of an intake pipe pressure, and for obtaining and storing the function expression in advance, the cylinder-charged air amount being an amount of fresh air charged in a cylinder, and the intake pipe pressure being a pressure in the intake pipe downstream of the throttle valve; means for obtaining the intake pipe pressure; and means for calculating the difference from the obtained intake pipe pressure using the function expression, and for calculating an exhaust gas recirculation control valve passing-through gas amount, which is an amount of the recirculated exhaust gas passing through the exhaust gas recirculation control valve when the exhaust gas recirculation control valve is opened, based on the difference.

The present invention may be more fully understood from the description of the preferred embodiments of the invention as set forth below, together with the accompanying drawings.

BRIEF DESCRIPTION OF THE DRAWINGS

FIG. 15 shows a diagram illustrating an example of a relationship between the difference $\Delta$KL and the intake pipe pressure Pm;

FIGS. 16A through 16C show diagrams illustrating gradients h1 and h2 and a difference i at a connecting point, respectively;

FIG. 18 shows a diagram illustrating a relationship between an opening degree of the EGR control valve and a step number STP;

BEST MODE FOR CARRYING OUT THE INVENTION

Figure 1:
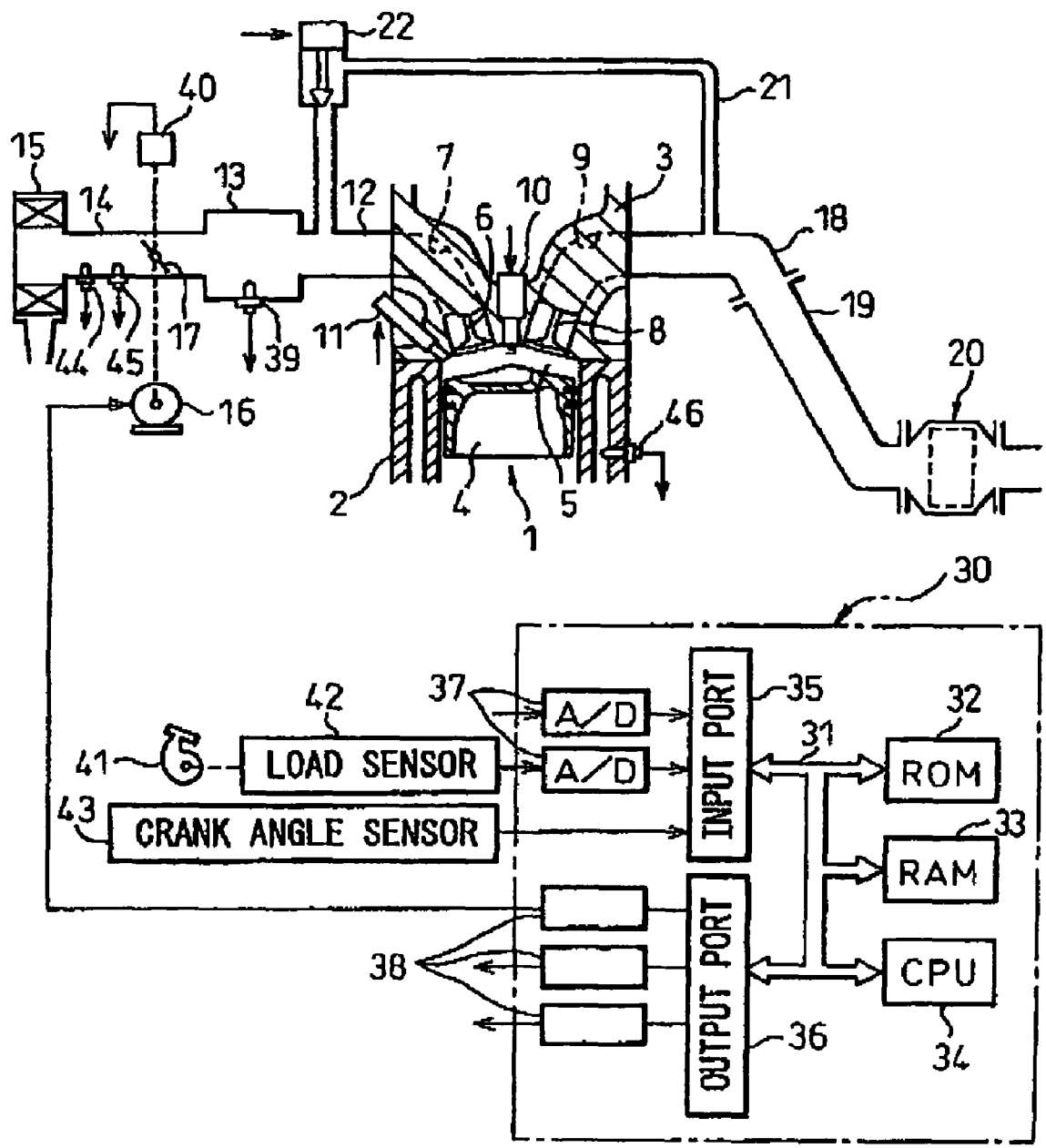
FIG. 1 shows a general view of an internal combustion engine.

FIG. 1 shows a case in which the present invention is applied to a spark ignition internal combustion engine. However, the present invention can also be applied to a compression ignition internal combustion engine.

With reference to FIG. 1, numeral 1 depicts an engine body 1 comprising, for example, four cylinders, 2 depicts a cylinder block, 3 depicts a cylinder head, 4 depicts a piston, 5 depicts a combustion chamber, 6 depicts an intake valve, 7 depicts an intake port, 8 depicts an exhaust valve, 9 depicts an exhaust port 9, 10 depicts an ignition plug, and 11 depicts a fuel injector. The intake port 7 is coupled to a surge tank 13 via a respective intake branch 12 and the surge tank 13 is, in turn, coupled to an air cleaner 15 via an intake duct 14. A throttle valve 17 driven by a step motor 16 is disposed in the intake duct 14. Note that the intake duct downstream of the throttle valve 17, the surge tank 13, the intake branch 12 and the intake port 7 may be collectively referred to as an intake pipe in this specification.

On the other hand, the exhaust port 11 is coupled to a catalytic converter 20 via an exhaust manifold 18 and an exhaust pipe 19, and the catalytic converter 20 is communicated to an atmosphere via a muffler (not shown).

The exhaust manifold 18 and each intake branch 12 are coupled to each other via an exhaust gas recirculation (hereinafter referred to as EGR) supply pipe 21 and an electrically-controlled EGR control valve 22 is disposed in the EGR supply pipe 21. In the internal combustion engine shown in FIG. 1, the EGR supply pipe 21 downstream of the EGR control valve 22 is split into branches connected to the respective intake branch 12. Here, the EGR control valve 22 is provided with a step motor and as a step number STP of this step motor is increased, an opening degree of the EGR control valve 22 is also increased. In other words, the step number STP represents the opening degree of the EGR control valve 22.

An electronic control unit 30 consists of a digital computer and comprises a ROM (read only memory) 32, a RAM (random access memory) 33, a CPU (microprocessor) 34, an input port 35 and an output port 36, which are interconnected by a bidirectional bus 31. A pressure sensor 39 for detecting an intake pipe pressure Pm, which is a pressure in the intake pipe, is attached to the surge tank 13. Further, a throttle opening degree sensor 40 for detecting an opening degree of the throttle valve is attached to the throttle valve 17. Still further, a load sensor 42 for detecting a depression of an accelerator pedal 41 is connected to the accelerator pedal 41. The depression of the accelerator pedal 41 represents a required load. Still further, an atmospheric temperature sensor 44 for detecting an atmospheric temperature and an atmospheric pressure sensor 45 for detecting an atmospheric pressure are attached to the intake duct 14 and a water temperature sensor 46 for detecting an engine coolant temperature THW is attached to the cylinder block 2. Output signals of these sensors 39, 40, 42, 44, 45 and 46 are input to the input port 35 via respective AD converters 37. Still further, a crank angle sensor 43 generating an output pulse at every 30° rotation of a crank shaft, for example, is connected to the input port 35. The CPU 34 calculates an engine speed NE based on the output pulse of the crank angle sensor 43. On the other hand, the output port 36 is connected via respective driving circuits 38 to the ignition plug 10, the fuel injector 11, the step motor 16 and the EGR control valve 22, which are controlled based on an output signal from the electronic control unit 30.

In the internal combustion engine shown in FIG. 1, a fuel injection amount QF is calculated based on the following equation, for example:

$$QF = kAF \cdot KL$$

where kAF represents an air-fuel ratio setting coefficient and KL represents an engine load ratio (%).

The air-fuel ratio setting coefficient kAF is a coefficient representing a target air-fuel ratio which becomes small as the target air-fuel ratio becomes large or lean and which becomes large as the target air-fuel ratio becomes small or rich. The air-fuel ratio setting coefficient kAF is stored in the ROM 32, in advance, as a function of an engine operating condition such as the required load and the engine speed.

On the other hand, the engine load ratio KL represents an amount of fresh air charged in each cylinder and is defined by the following equation, for example:

$$KL(\%) = \frac{Mcair}{\frac{DSP}{NCYL} \cdot pastd} \cdot 100$$
$$= kk \cdot Mcair$$

Here, Mcair represents a cylinder-charged air amount (g) which is an amount of fresh air having been charged in each cylinder when the intake valve 7 is closed after it is opened, DSP represents an engine displacement (liter), NCYL represents the number of cylinders, and pastd (about 1.2 g/liter) represents a density of air in standard conditions (1 atmospheric pressure, 25° C.). Further, kk represents these coefficients integrated into one value, and thus the cylinder-charged air amount Mcair can be expressed by KL/kk.

Therefore, what is needed to make an actual air-fuel ratio equal to the target air-fuel ratio accurately, is to obtain the engine load ratio KL accurately.

When the EGR control valve 22 is opened and thus the EGR gas is supplied, a gas mixture of the fresh air and the EGR gas is sucked into each cylinder. Therefore, if the amounts of the gas mixture and the EGR gas having been charged in each cylinder when the intake valve 7 is closed after it is opened, are referred to as a cylinder-charged gas amount Mc and a cylinder-charged EGR gas amount Mcegr, respectively, the cylinder-charged gas amount Mc can be expressed with a sum of the cylinder-charged air amount Mcair and the cylinder-charged EGR gas amount Mcegr (Mc=Mcair+Mcegr).

In this connection, it is known that a cylinder-charged gas amount Mc can be expressed with a linear function expression of the intake pipe pressure Pm when the intake valve 7 is closed. That is, theoretically and empirically, the cylinder-charged gas amount Mc is proportional to a pressure in a cylinder when the intake valve 7 is closed and this pressure in the cylinder is substantially equal to a mixed gas pressure upstream of the intake valve 7, or the intake pipe pressure Pm.

As only fresh air is charged in the cylinder when the EGR gas is not supplied, the cylinder-charged air amount Mcair and thus the engine load ratio KL can be expressed with the linear function expression of the intake pipe pressure Pm at this condition. Therefore, the engine load ratio KL can be obtained simply and accurately.

However, when the EGR gas is supplied, the circumstances are completely different in that not only the fresh air but also the EGR gas is charged in the cylinder. Therefore, conventionally, it has been thought absolutely impossible to express the cylinder-charged air amount Mcair or the engine load ratio KL with the linear function expression of the intake pipe pressure Pm.

Considering the fact that the cylinder-charged gas amount Mc can be expressed with the linear function expression of the intake pipe pressure Pm and is a sum of the cylinder-charged air amount Mcair and the cylinder-charged EGR gas amount Mcegr, the cylinder-charged air amount Mcair or the engine load ratio KL when the EGR gas is supplied can be expressed with the linear function expression of the intake pipe pressure Pm, if the cylinder-charged EGR gas amount Mcegr can be expressed with the linear function expression of the intake pipe pressure Pm.

However, conventionally, it has been thought impossible to express the cylinder-charged EGR gas amount Mcegr with the linear function of the intake pipe pressure Pm, too. This will be described with reference to FIGS. 2A and 2B.

Figure 2A:
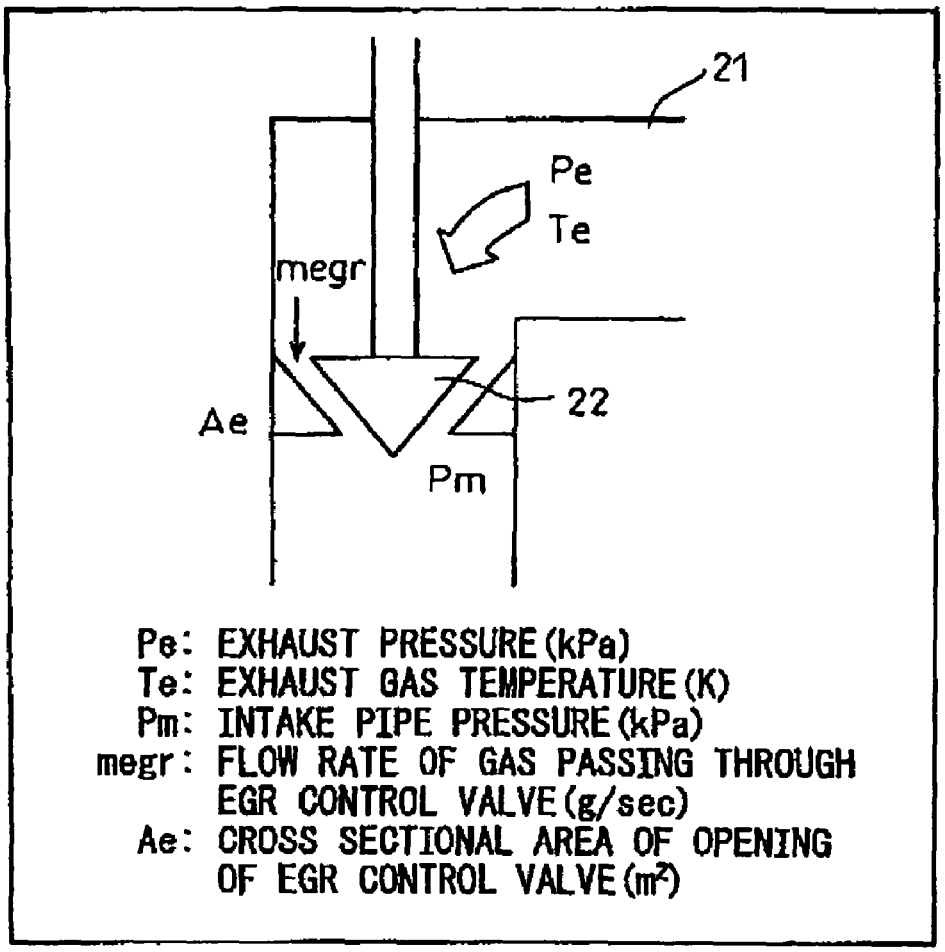
FIGS. 2A and 2B show diagrams for explaining EGR control valve passing-through gas flow rate megr.

First, as shown in FIG. 2A, assuming that an EGR gas pressure upstream of the EGR control valve 22 is equal to an exhaust pressure Pe (kPa) in the exhaust manifold 18, a EGR gas temperature upstream of the EGR control valve is equal to an exhaust gas temperature Te (K) in the exhaust manifold 18, and a pressure of the EGR gas passing through the EGR control valve 22 is the intake pipe pressure Pm (kPa), an EGR control valve passing-through gas flow rate megr (g/sec), which is a flow rate of the EGR gas passing through the EGR control valve 22, can be expressed with the following equation (1):

$$megr = \mu \cdot Ae \cdot \frac{Pe}{\sqrt{Re \cdot Te}} \cdot \Phi\left(\frac{Pm}{Pe}\right) \quad (1)$$

Here, $\mu$ represents a flow rapte coefficient at the EGR control valve 22, Ae represents a cross sectional area of an opening of the EGR control valve 22 ($m^2$), Re represents a constant regarding the gas constant R, and $\Phi(Pm/Pe)$ represents a function of Pm/Pe. Here, the flow rate coefficient $\mu$ and the opening cross sectional area Ae depend on an opening degree $\theta e$ of the EGR control valve 22, and the constant Re is obtained by dividing the gas constant R by a mass Me of the exhaust gas or the EGR gas per 1 mol (Re=R/Me).

Further, the function $\Phi(Pm/Pe)$ is expressed with the following equation using a specific heat ratio $\kappa$ (constant) so that the flow rate of the EGR gas does not exceed a sonic velocity:

$$\Phi\left(\frac{Pm}{Pe}\right) = \begin{cases} \sqrt{\frac{\kappa}{2(\kappa+1)}} & \frac{Pm}{Pe} > \frac{1}{\kappa+1} \\ \sqrt{\left\{\left(\frac{\kappa-1}{2\kappa}\right)\cdot\left(1-\frac{Pm}{Pe}\right)+\frac{Pm}{Pe}\right\}\cdot\left(1-\frac{Pm}{Pe}\right)} & \frac{Pm}{Pe} \leq \frac{1}{\kappa+1} \end{cases}$$

Briefly described, the equation (1) mentioned above is derived using conservation laws of mass, energy and momentum regarding the EGR gas at the upstream and downstream of the EGR control valve 22, as well as the characteristic equations of the EGR gas at the upstream and downstream of the EGR control valve 22.

Figure 2B:
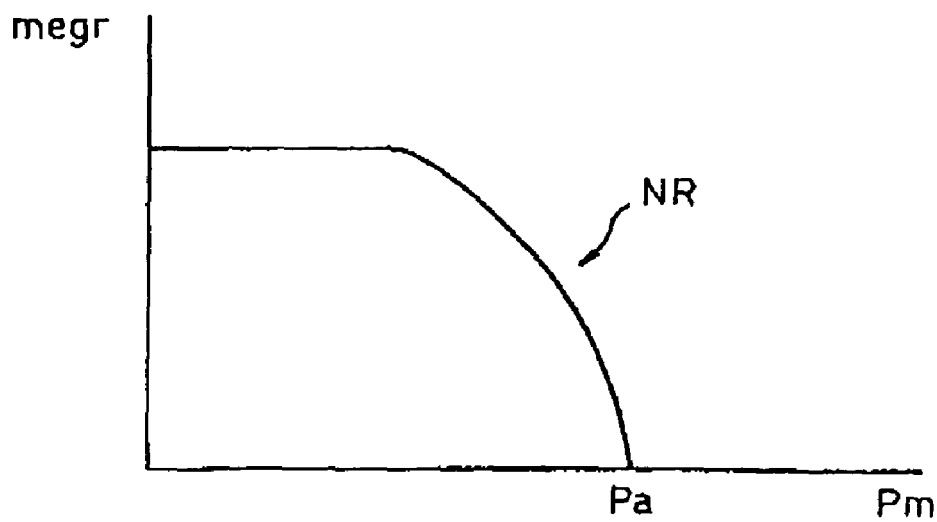

Here, assuming that the exhaust pressure Pe is equal to the atmospheric pressure Pa in order to simplify calculation, the EGR control valve passing-through gas flow rate megr expressed with the equation (1) appears as shown in FIG. 2B. More specifically, when the intake pipe pressure Pm is low, the EGR control valve passing-through gas flow rate megr is maintained substantially constant and, as the intake pipe pressure Pm is increased, the EGR control valve passing-through gas flow rate megr is reduced toward the atmospheric pressure while showing nonlinearity to the intake pipe pressure Pm, as shown by NR in FIG. 2B. Here, this nonlinear portion NR is based on the term $PE/\sqrt{Te}$ and the function $\Phi(Pm/Pe)$ in the equation (1).

Therefore, it has been thought impossible to express the EGR control valve passing-through gas flow rate megr and, in particular, its nonlinear portion NR with a linear function expression of the intake pipe pressure Pm. Indeed, if a considerably large number of linear function expressions of the intake pipe pressure Pm are used, it may be thought possible to express the EGR control valve passing-through gas flow rate megr with the linear function expressions. However, in this case, it cannot be said that the engine load ratio KL is obtained simply.

However, the inventors of the present invention have found that the EGR control valve passing-through gas flow rate megr can be expressed with two linear function expressions of the intake pipe pressure Pm and, therefore, the cylinder-charged air amount Mcair or the engine load ratio KL can also be expressed with two linear function expressions of the intake pipe pressure Pm.

Figure 3:
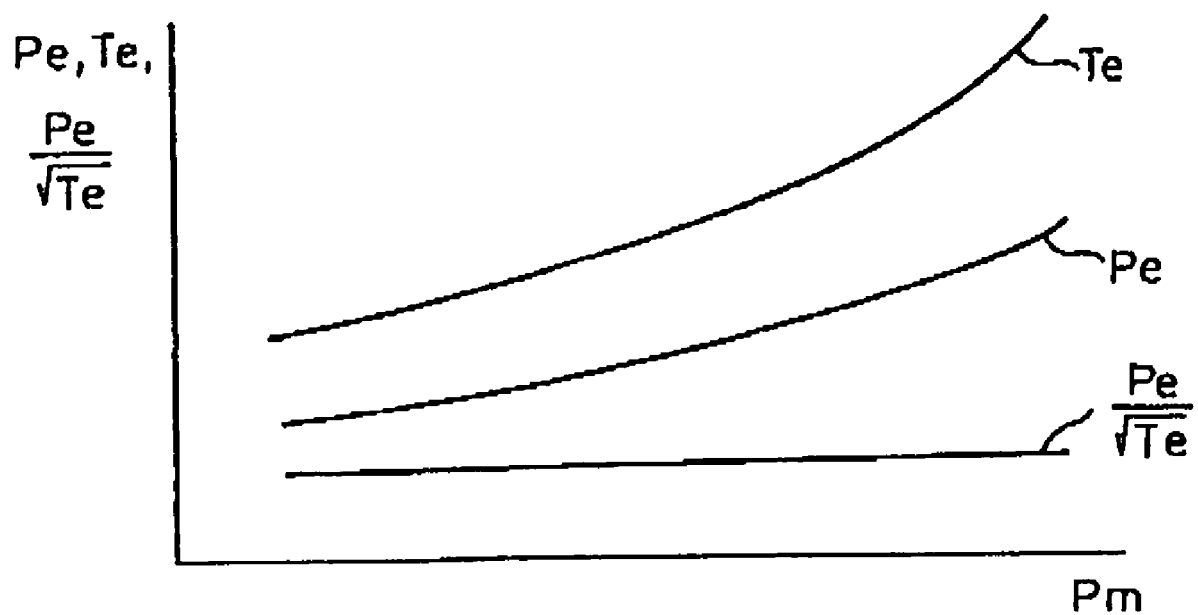
FIG. 3 shows a diagram illustrating an exhaust pressure Pe, an exhaust temperature Te and $Pe/\sqrt{Te}$.

Specifically, first, as shown in FIG. 3, as the intake pipe pressure Pm increases, the exhaust gas temperature Te increases more significantly than the exhaust pressure Pe increases and, as a result, $Pe/\sqrt{Te}$ can be expressed by the linear function expression of the intake pipe pressure Pm.

Figure 4A:
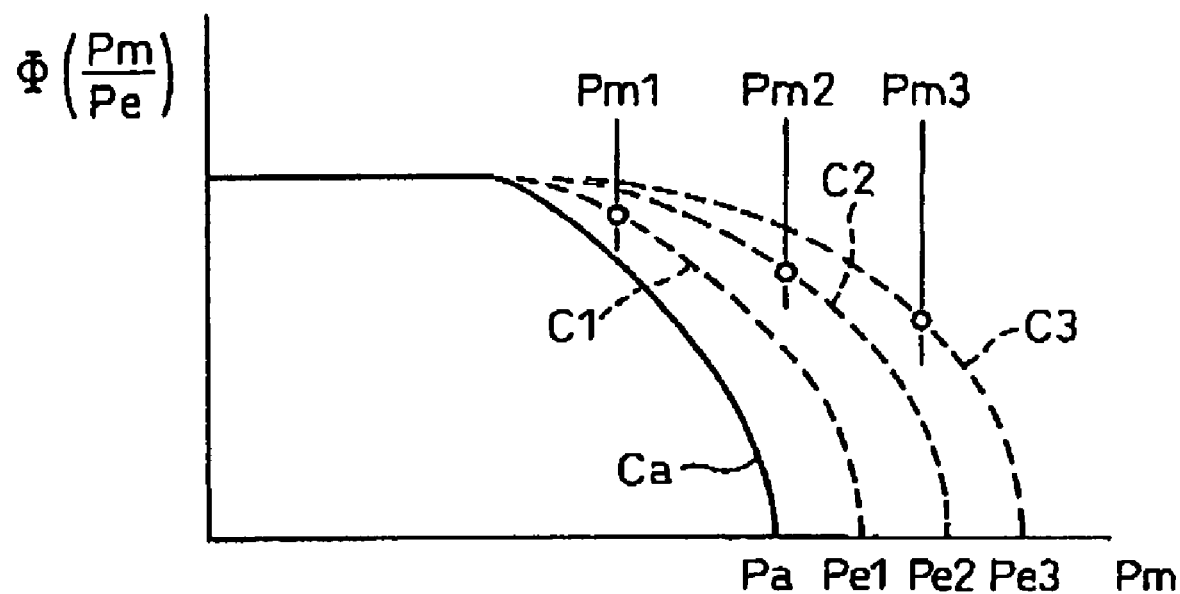
FIGS. 4A and 4B show diagrams illustrating a function $\Phi(Pm/Pe)$.

Further, the function $\Phi(Pm/Pe)$ can also be expressed with the linear function expression of the intake pipe pressure Pm. This will be explained with reference to FIGS. 4A and 4B. Considering the fact that the exhaust pressure Pe is not maintained at the constant atmospheric pressure Pa but it varies in accordance with the intake pipe pressure Pm, the function $\Phi(Pm/Pe)$ when the intake pipe pressure Pm is equal to Pm1 lies not on a curve CA converging to the atmospheric pressure Pa, but on a curve C1 converging to the exhaust pressure Pe1, as shown by plots (○) as shown in FIG. 4A. Similarly, $\Phi(Pm/Pe)$ when Pm=Pm2 (>Pm1) lies on a curve C2 converging to the exhaust pressure Pe2 (>Pe1) and, $\Phi(Pm/Pe)$ when Pm=Pm3 (>Pm2) lies on a curve C3 converging to the exhaust pressure Pe3(>Pe2).

Figure 4B:
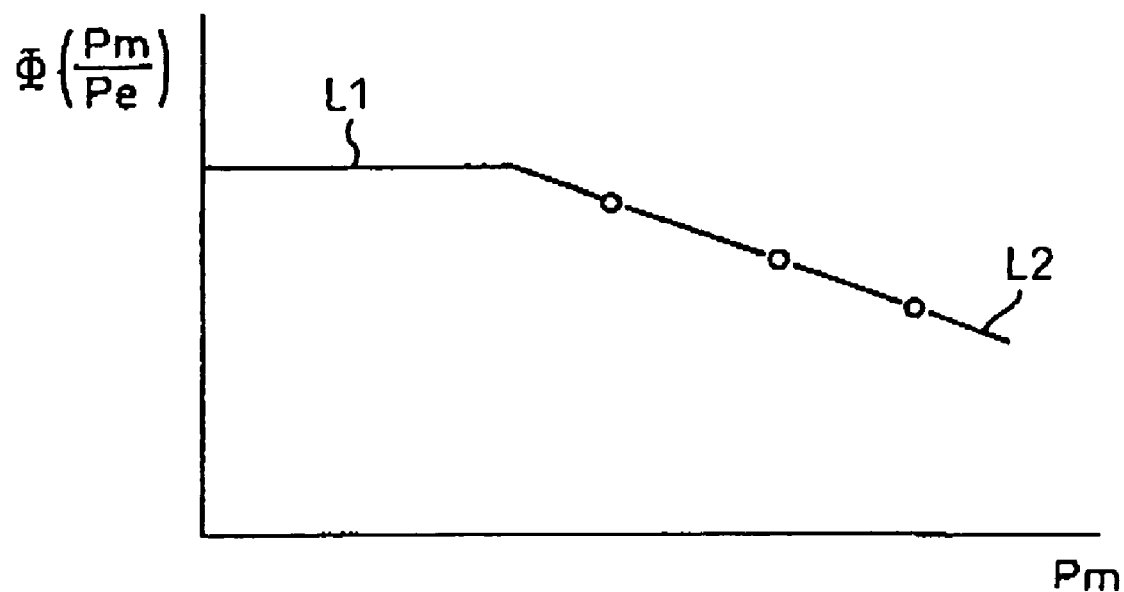

The plots obtained in this way can be connected by a straight line L2 as shown in FIG. 4B. Therefore, the function $\Phi(Pm/Pe)$ can be expressed with one linear function expression of the intake pipe pressure Pm corresponding to a straight line L1 when the intake pipe pressure Pm is low, and with the other linear function expression of the intake pipe pressure Pm corresponding to the straight line L2 when the intake pipe pressure Pm is high and, therefore, it can be expressed with two linear function expressions of the intake pipe pressure Pm. Namely, the EGR control valve passing-through gas flow rate megr can be expressed with the two linear function expressions of the intake pipe pressure Pm.

Here, in the engine steady operation, the EGR control valve passing-through gas flow rate megr, which is the EGR gas amount flowing into the intake pipe per unit time, is equal to a cylinder-sucked EGR gas amount mcegr (g/sec), which is the EGR gas amount exiting from the intake pipe and flowing into the cylinder per unit time. Further, the cylinder-charged EGR gas amount Mcegr is obtained by multiplying the cylinder-sucked EGR gas amount mcegr by a time period $\Delta T$ (sec) required for one intake stroke of each cylinder (Mcegr=mcegr·$\Delta T$).

As a result, the cylinder-charged EGR gas amount Mcegr in the engine steady operation can be expressed with the linear function expression of the intake pipe pressure Pm.

Therefore, the cylinder-charged air amount Mcair or the engine load ratio KL in the engine steady operation with the EGR gas being supplied can be expressed with the two linear function expressions of the intake pipe pressure Pm.

Figure 5:
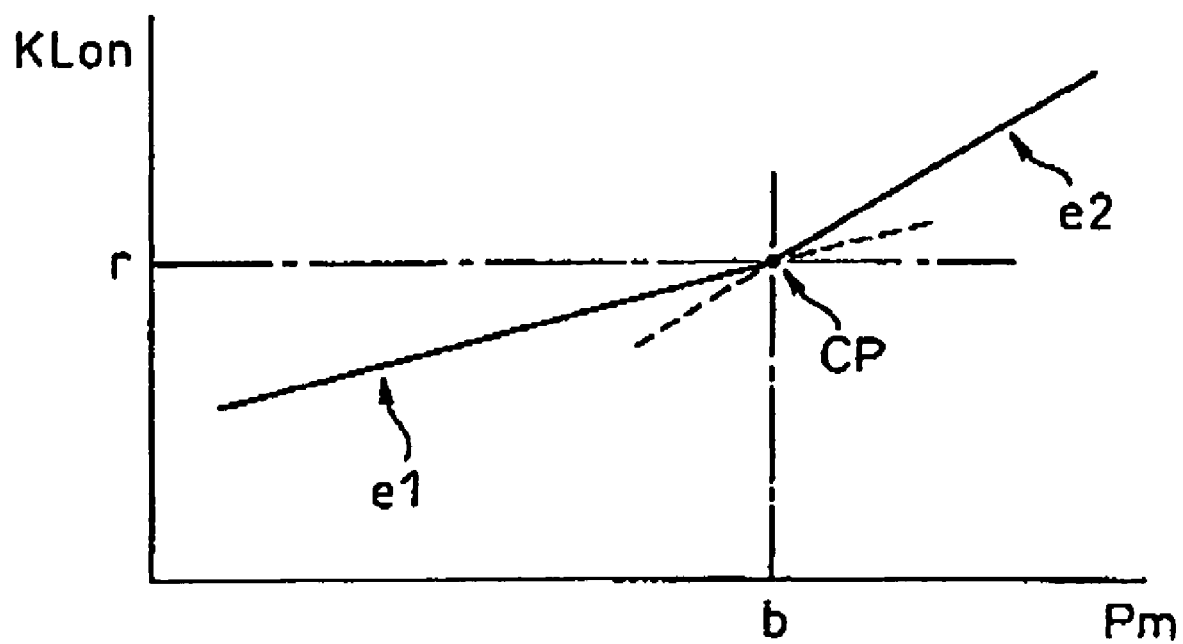
FIG. 5 shows a diagram illustrating an example of a relationship between an engine load ratio KLon and an intake pipe pressure Pm.

If the engine load ratio KL when the EGR gas is supplied is referred to as KLon, FIG. 5 shows an example of the two linear function expressions of the intake pipe pressure Pm expressing the engine load ratio KLon in the engine steady operation, with the constant engine speed NE and the constant opening degree of the EGR control valve STP. As shown in FIG. 5, the engine load ratio KLon is expressed with the two linear function expressions having different gradients from each other and continuous with each other at a connecting point CP. More specifically, the engine load ratio KLon is expressed with one linear function expression having a gradient e1 when the intake pipe pressure Pm is low, and is expressed with the other linear function expression having a gradient e2 when the intake pipe pressure Pm is high.

Here, designating the gradients of the two linear function expressions as e1 and e2, respectively, and the intake pipe pressure and the engine load ratio at the connecting point CP as b and r, respectively, the two linear function expressions can be expressed with the following equations:

$$KLon = e1 \cdot (Pm-b) + r \ldots Pm \leq b$$

$$KLon = e2 \cdot (Pm-b) + r \ldots Pm > b$$

These equations can be integrated into the following equation (2):

$$KLon = e \cdot (Pm-b) + r \quad (2)$$

$$e = e1 \ldots Pm \leq b$$

$$e = e2 \ldots Pm > b$$

In the embodiment of the present invention, the two linear function expressions of the intake pipe pressure Pm expressing the engine load ratio KLon in the engine steady operation are stored in the ROM 32 in advance in the form of the equation (2). It allows the two linear function expressions to be expressed with three parameters e, b and r. Thus, the number of parameters required to express the two linear function expressions is reduced.

The parameters e, b and r of the equation (2) is calculated in accordance with the following equations:

$$e1 = e1^* \cdot ktha$$

$$e2 = e2^* \cdot ktha$$

$$b = b^* \cdot ktha \cdot kpa$$

$$r = r^* \cdot ktha \cdot kpa$$

where e1*, e2*, b* and r* are the gradients and the intake pipe pressure and the engine load ratio at the connecting point, respectively, when an engine environmental condition is a predetermined reference environmental condition. While any condition may be used as the reference environmental condition, the standard condition (1 atmospheric pressure, 25° C.) is used as the reference environmental condition in the embodiment of the present invention.

On the other hand, ktha and kpa represent an atmospheric temperature correction coefficient and an atmospheric pressure correction coefficient, respectively. The atmospheric temperature correction coefficient ktha is for correcting each of the parameters e1*, e2*, b* and r* in the reference environmental condition, based on the actual atmospheric temperature detected by the atmospheric temperature sensor 44, and is made equal to 1.0 when the correction is not necessary. Further, the atmospheric pressure correction coefficient kpa is for correcting each of the parameters b* and r* in the reference environmental condition, based on the actual atmospheric pressure detected by the atmospheric pressure sensor 45, and is made 1.0 when the correction is not necessary.

Therefore, considering the fact that the atmospheric temperature correction coefficient ktha or the atmospheric pressure correction coefficient kpa are representative values representing the actual engine environmental condition, it can be said that the parameters e1*, e2*, b* and r* in the reference environmental condition are corrected based on the representative values representing the actual engine environmental condition. Alternatively, it can be considered that the engine load ratio KLon in the reference environmental condition is corrected based on the representative values representing the actual engine environmental condition.

On the other hand, in the embodiment of the present invention, the parameters e* (e1* and e2*), b* and r* are set in accordance with the opening degree of the EGR control valve STP or the engine speed NE, taking the fact that the opening cross sectional area Ae of the EGR control valve 22 depends on the opening degree of the EGR control valve STP and the engine charging efficiency depends on the engine speed NE, into account.

Figure 6A:
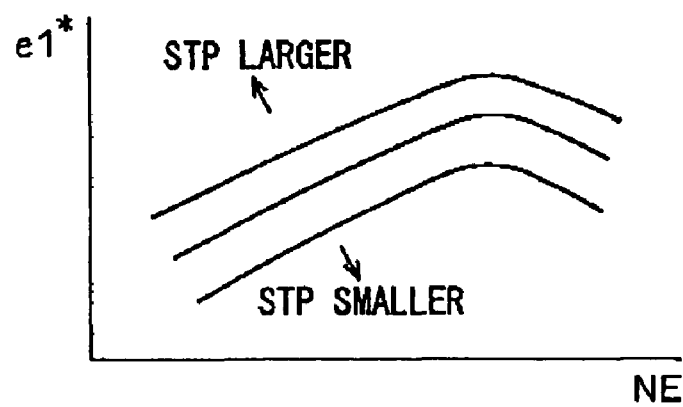
FIGS. 6A and 6C show diagrams illustrating gradient e1.
Figure 6B:
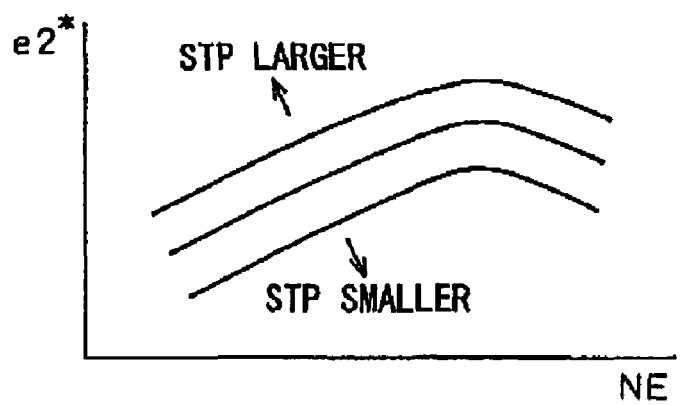
FIGS. 6B and 6D show diagrams illustrating gradient e2.
Figure 6C:
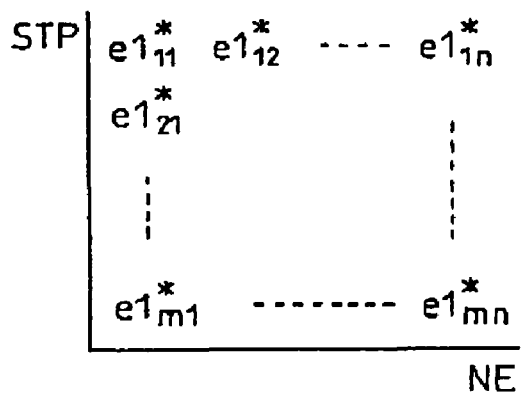
Figure 6D:
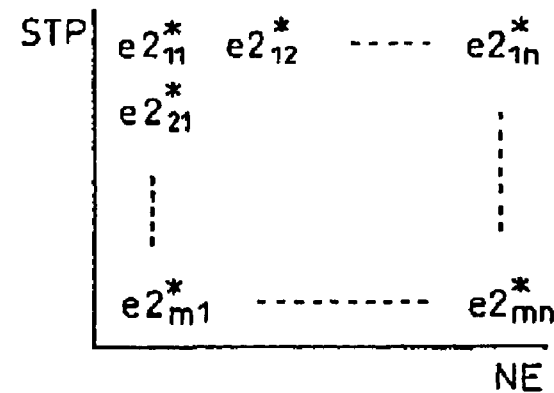

More specifically, as shown in FIG. 6A, the gradient e1* becomes larger as the engine speed NE becomes higher when the engine speed NE is low, becomes smaller as the engine speed NE becomes higher when the engine speed NE is high, and becomes larger as the opening degree of the EGR control valve STP becomes larger. The gradient e2* becomes larger as the engine speed NE becomes higher when the engine speed NE is low, becomes smaller as the engine speed NE becomes higher when the engine speed NE is high, and becomes larger as the opening degree of the EGR control valve STP becomes larger, as shown in FIG. 6B. These gradients e1* and e2* are obtained by experiment and are stored in the ROM 32, in advance, as functions of the engine speed NE and the opening degree of the EGR control valve STP in the form of maps shown in FIGS. 6C and 6D, respectively.

Figure 7:
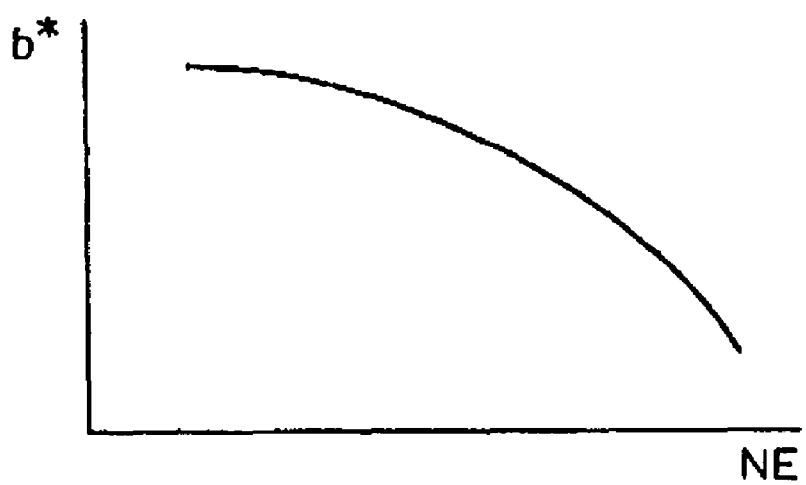
FIG. 7 shows a diagram illustrating an intake pipe pressure b at a connecting point.

On the other hand, as shown in FIG. 7, the intake pipe pressure b* at the connecting point CP becomes smaller as the engine speed NE becomes higher. The intake pipe pressure b* at the connecting point CP is also obtained by experiment, in advance, and stored in the ROM 32 as a function of the engine speed NE in the form of a map as shown in FIG. 7.

Figure 8A:
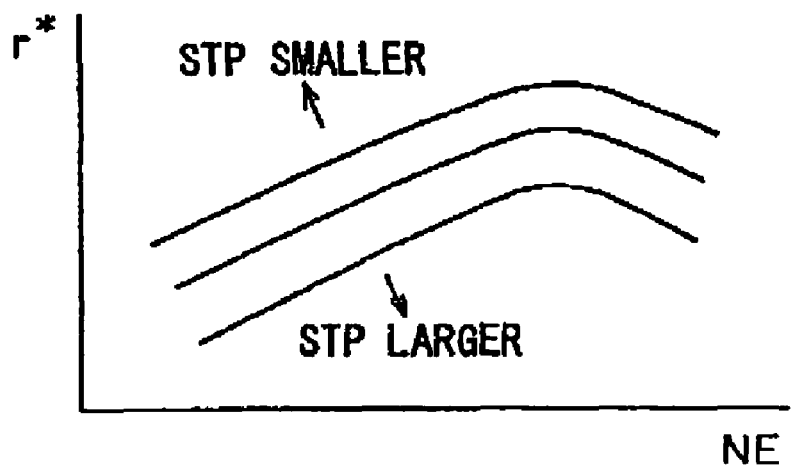
FIGS. 8A and 8B show diagrams illustrating an engine load ratio r at a connecting point.
Figure 8B:
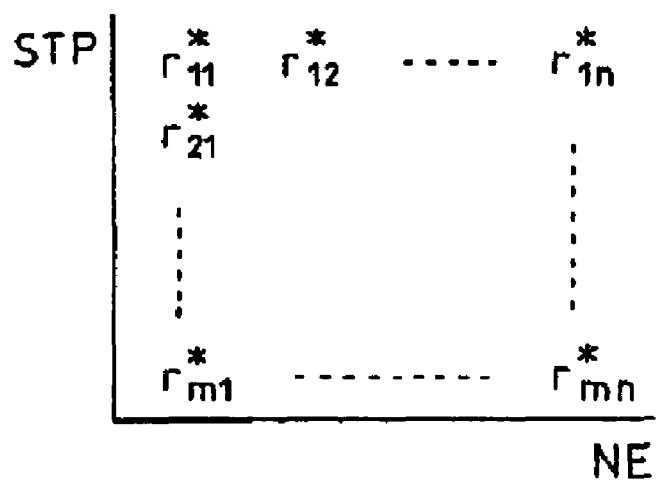

Further, as shown in FIG. 8A, the gradient r* at the connecting point CP becomes larger as the engine speed NE becomes higher when the engine speed NE is low, becomes smaller as the engine speed NE becomes higher when the engine speed NE is high, and becomes smaller as the opening degree of the EGR control valve STP becomes larger. The engine load ratio r* at the connecting point CP is also obtained by experiments in advance and stored in the ROM 32 as a function of the engine speed NE and the opening degree of the EGR control valve STP in the form of a map as shown in FIG. 8B.

Therefore, generally speaking, two linear function expressions of the intake pipe pressure Pm expressing the cylinder-charged air amount Mcair or the engine load ratio KLon in the engine steady operation are obtained and stored in advance, for different opening degrees of the EGR control valve. Further, two linear function expressions of the intake pipe pressure Pm expressing the cylinder-charged air amount Mcair or the engine load ratio KLon in the engine steady operation are obtained and stored in advance for different engine speeds.

Figure 9:
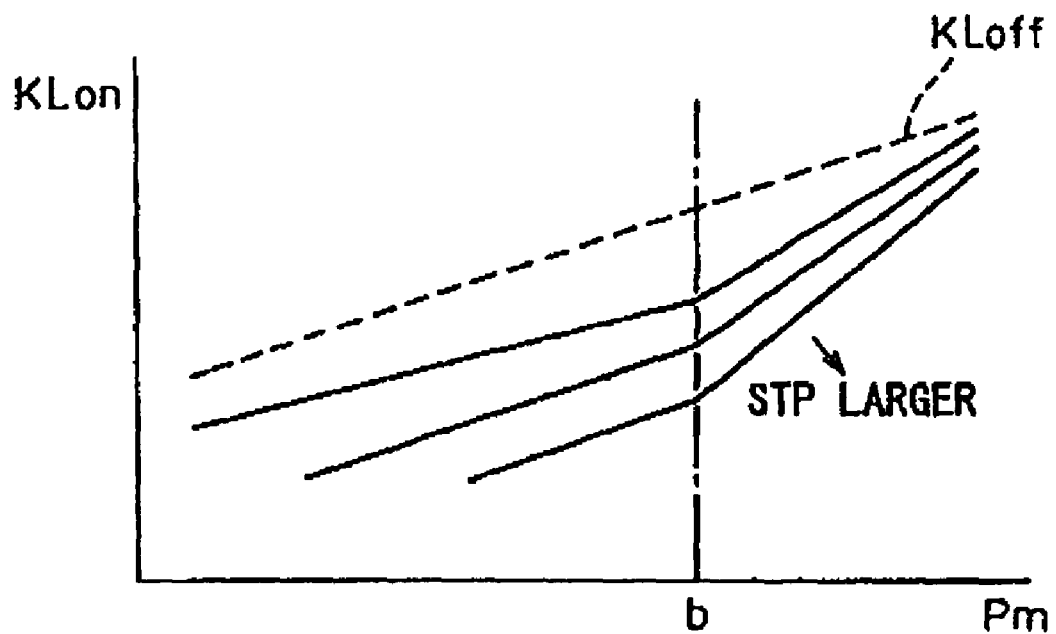
FIG. 9 is a diagram illustrating an example of a relationship between the engine load ratio KLon and the intake pipe pressure Pm.

FIG. 9 shows an example of the two linear function expressions of the intake pipe pressure Pm expressing the engine load ratio KLon in the engine steady operation with a constant engine speed NE and various opening degrees of the EGR control valve. Note that a broken line in FIG. 9 represents the engine load ratio KLoff when the EGR gas is not supplied or the opening degree of the EGR control valve STP is made zero.

Figure 10:
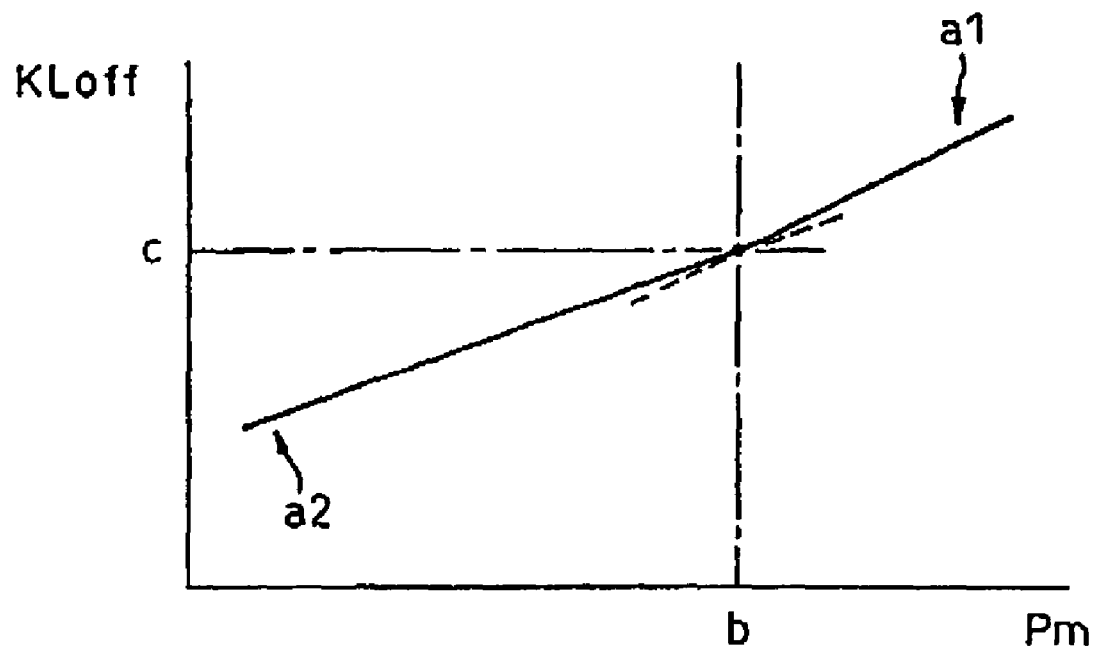
FIG. 10 is a diagram illustrating an example of a relationship between an engine load ratio KLoff and the intake pipe pressure Pm.

On the other hand, as described above, the engine load ratio KLoff when the EGR gas is not supplied can be expressed with a linear function expression of the intake pipe pressure Pm. FIG. 10 shows an example of two linear function expressions of the intake pipe pressure Pm expressing the engine load ratio KLoff in the engine steady operation with a constant engine speed NE. In the embodiment according to the present invention, as shown in FIG. 10, the engine load ratio KLoff is expressed with the two linear function expressions of the intake pipe pressure Pm having different gradients from each other and continues with each other at a connecting point CP. More specifically, the engine load ratio KLoff is expressed with one linear function expression having the gradient a1 when the intake pipe pressure Pm is low, and expressed with the other linear function expression having the gradient a2 when the intake pipe pressure Pm is high.

Here, if the gradients of the two linear function expressions are referred to as a1 and a2, respectively, and the intake pipe pressure and the engine load ratio at the connecting point CP are referred to as b and c, respectively, these two linear function expressions can be expressed with the following equations:

$$KLoff = a1 \cdot (Pm-b) + c \ldots Pm \leq b$$

$$KLoff = a2 \cdot (Pm-b) + c \ldots Pm > b$$

These equations can be integrated into the following equation (3):

$$KLoff = a \cdot (Pm-b) + c \quad (3)$$

$$a = a1 \ldots Pm \leq b$$

$$a = a2 \ldots Pm > b$$

In the embodiment of the present invention, the two linear function expressions of the intake pipe pressure Pm expressing the engine load ratio KLoff in the steady engine operation are stored in the ROM 32 in advance in the form of the equation (3). In this case, the intake pipe pressure b at the connecting point CP is identical to the one at the connecting point CP for the engine load ratio KLon described above. Therefore, the number of parameters can be further reduced.

Of course, the intake pipe pressures at these connecting points CP may be different from each other.

The parameters a and c of the equation (3) are calculated based on the following equations:

$$a1 = a1^* \cdot ktha$$

$$a2 = a2^* \cdot ktha$$

$$c = c^* \cdot ktha \cdot kpa$$

where, a1* and a2*, and c* are the gradients and the engine load ratio at the connecting point, respectively, when an engine environmental condition is the predetermined reference environmental condition as described above, or in the standard condition.

Therefore, considering the fact that the atmospheric temperature correction coefficient ktha or the atmospheric pressure correction coefficient kpa are representative values representing the actual engine environmental condition, it can be said that the parameters a1*, a2* and c* in the reference environmental condition are corrected based on the representative values representing the actual engine environmental condition. Alternatively, it can be considered that the engine load ratio KLoff in the reference environmental condition is corrected based on the representative values representing the actual engine environmental condition.

On the other hand, in the embodiment of the present invention, the parameters a* (a1* and a2*) and c* are set in accordance with the engine speed NE, taking the fact that the engine charging efficiency depends on the engine speed NE into account.

Figure 11A:
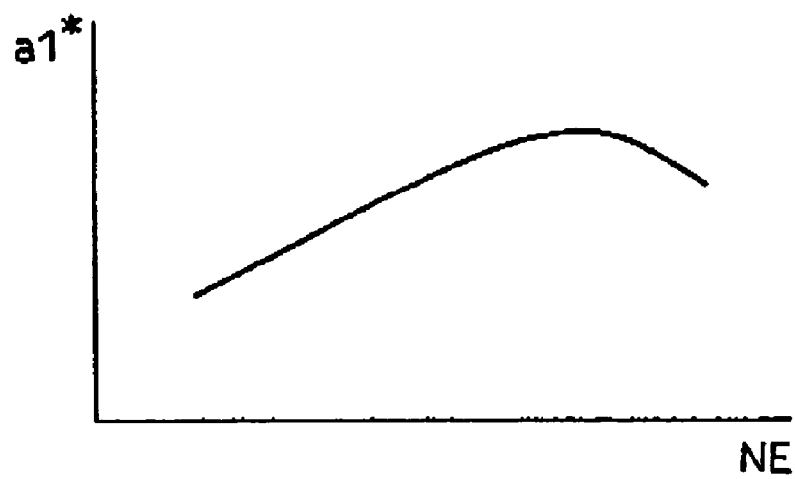
FIGS. 11A and 11B show diagrams illustrating gradients a1 and a2, respectively.
Figure 11B:

More specifically, as shown in FIG. 11A, the gradient a1* becomes larger as the engine speed NE becomes higher when the engine speed NE is low, and becomes smaller as the engine speed NE becomes higher when the engine speed NE is high. The gradient a2* becomes larger as the engine speed NE becomes higher when the engine speed NE is low, and becomes smaller as the engine speed NE becomes higher when the engine speed NE is high, as shown in FIG. 11B. These gradients a1* and a2* are obtained by experiments and stored in the ROM 32 in advance as a function of the engine speed NE in the form of maps shown in FIGS. 11A and 11B, respectively.

Figure 12:
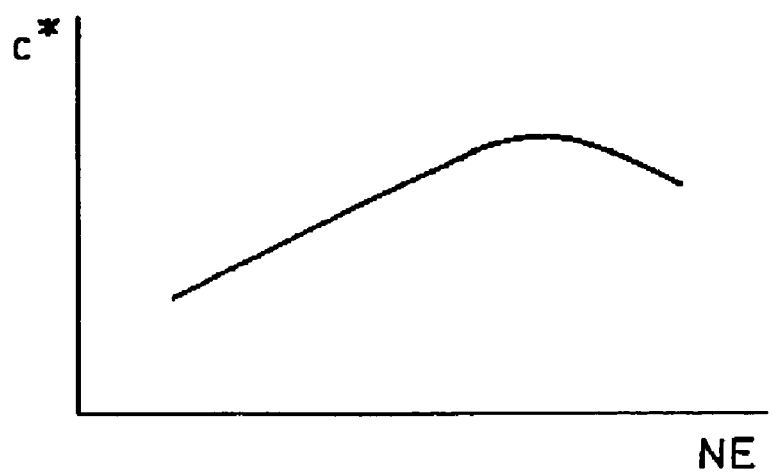
FIG. 12 shows a diagram illustrating an engine load ratio c at a connecting point.

Further, as shown in FIG. 12, the engine load ratio c* at the connecting point CP becomes larger as the engine speed NE becomes higher when the engine speed NE is low, and becomes smaller as the engine speed NE becomes higher when the engine speed NE is high. The engine load ratio c* at the connecting point CP is also obtained by experiments in advance and stored in the ROM 32 as a function of the engine speed NE in the form of a map as shown in FIG. 12.

Therefore, generally speaking, it can be said that two linear function expressions of the intake pipe pressure Pm expressing the cylinder-charged air amount Mcair or the engine load ratio KLoff in the engine steady operation for different engine speeds NE are determined and stored in advance.

As a result, when the intake pipe pressure Pm is detected by the pressure sensor 39, for example, the engine load ratio KLon or KLoff can be obtained accurately and simply using the equation (2) or (3) described above, from the detected intake pipe pressure Pm, and thus the air-fuel ratio can be made equal to the target air-fuel ratio accurately and simply.

The fact that the engine load ratios KLon and KLoff can be expressed with the linear function expression of the intake pipe pressure Pm means that there is no need to create respective maps representing the relationships between the engine load ratios KLon, KLoff and the intake pipe pressure Pm. Further, it also means that there is no need to solve complicated equations such as differential equations and, therefore, reduces a computation load on the CPU 34.

In this connection, as described above, the engine load ratio KL represents the cylinder-charged air amount Mcair (Mcair=KL/kk). Here, considering the fact that only fresh air is charged in the cylinder when the EGR gas is not supplied, it can be considered that the engine load ratio KLoff when the EGR gas is not supplied represents a total amount of the gas charged in the cylinder at this time, i.e., the cylinder-charged gas amount Mc.

Here, considering that the cylinder-charged gas amount Mc does not change whether the EGR gas is supplied or not, it can be said that the engine load ratio KLoff when the EGR gas is not supplied represents not only the cylinder-charged gas amount Mc when the EGR gas is not supplied but also the cylinder-charged gas amount Mc when the EGR gas is supplied.

On the other hand, as described above, the cylinder-charged air amount Mcair in the engine steady operation with the EGR gas being supplied is expressed with the engine load ratio KLon.

Accordingly, it can be said that a result of subtraction $\Delta KL$ (=KLoff−KLon) of the engine load ratio KLon when the EGR gas is supplied from the engine load ratio KLoff when the EGR gas is not supplied represents the cylinder-charged EGR gas amount Mcegr in the engine steady operation.

Figure 13:
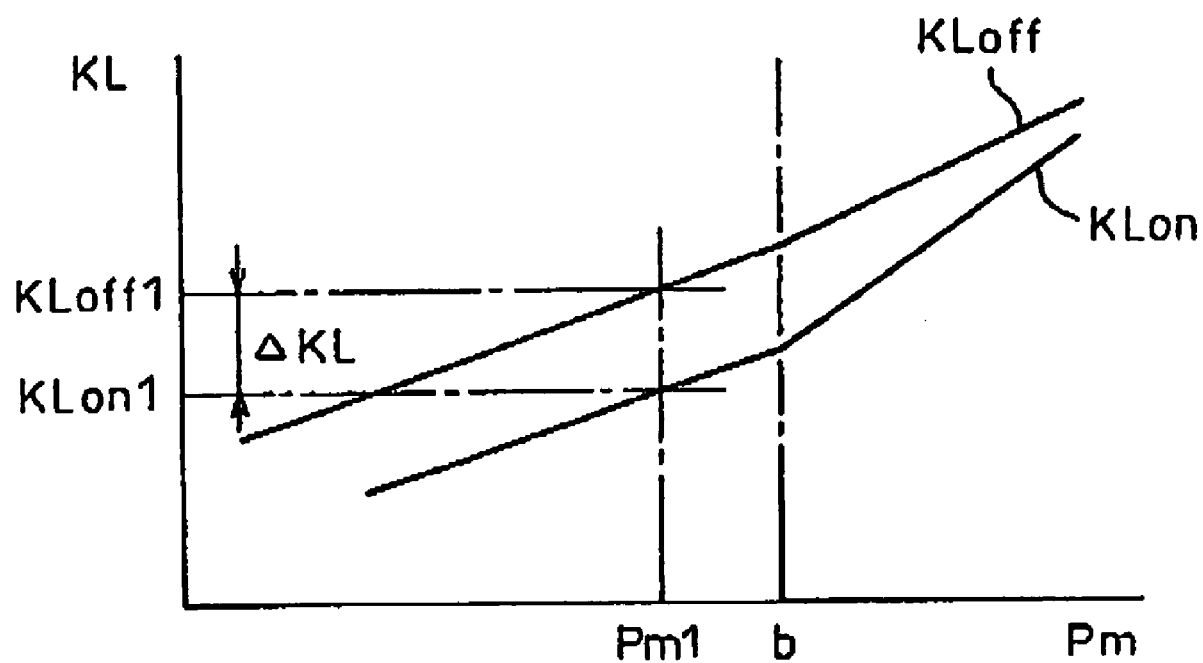
FIG. 13 shows a diagram for explaining a difference $\Delta$KL.

More specifically, as shown in FIG. 13, for example, assuming that KLoff=KLoff1 and KLon=KLon1 when Pm=Pm1, the cylinder-charged EGR gas amount Mcegr in the engine steady operation is expressed with $\Delta KL$ (=KLoff1−KLon1).

Therefore, the cylinder-charged EGR gas amount Mcegr in the engine steady operation can be calculated based on the following equation (4):

$$Mcegr = kegr1 \cdot \Delta KL \quad (4)$$

where kegr1 represents a conversion factor from the engine load ratio KL to the cylinder-charged EGR gas amount Mcegr.

Therefore, if the intake pipe pressure Pm is detected by the pressure sensor 39, for example, the cylinder-charged EGR gas amount Mcegr in the engine steady operation can be obtained accurately and simply using the equation (4) described above, from the detected intake pipe pressure Pm.

In this connection, in the engine steady operation, the EGR control valve passing-through gas flow rate megr and the cylinder-sucked EGR gas amount mcegr are equal to each other and the cylinder-charged EGR gas amount Mcegr can be expressed with the product of the cylinder-sucked EGR gas amount mcegr and $\Delta T$ (Mcegr=mcegr·$\Delta T$), as described above.

Therefore, it can be said that the difference $\Delta T$ mentioned above also represents the EGR control valve passing-through gas flow rate megr in the engine steady operation.

In the embodiment according to the present invention, the EGR control valve passing-through gas flow rate megr in the engine steady operation is calculated based on the following equation (5):

$$megr = kegr2 \cdot \Delta KL \quad (5)$$

where kegr2 represents a conversion factor from the engine load ratio KL to the EGR control valve passing-through gas flow rate megr.

As described above, the EGR control valve passing-through gas flow rate megr in the engine steady operation is calculated using the above-described equation (5). However, the EGR control valve passing-through gas flow rate megr in an engine transient operation can also be calculated using this equation (5).

More specifically, considering the fact that the EGR control valve passing-through gas flow rate megr greatly depends on the pressure difference between the upstream and downstream of the EGR control valve 22, i.e., the difference between the exhaust pressure Pe and the intake pipe pressure Pm, and that the exhaust pressure Pe and the exhaust temperature Te upstream of the EGR control valve 22 in the engine transient operation is less different from Pe and Te in the engine steady operation, it can be said that the EGR control valve passing-through gas flow rate megr can be determined if the intake pipe pressure Pm is determined.

Therefore, when the intake pipe pressure Pm is detected by the pressure sensor 39, for example, the EGR control valve passing-through gas flow rate megr both in the engine steady and transient operations can be determined accurately and simply using the above-described equation (5) from the detected intake pipe pressure Pm. In this case, the cylinder-charged EGR gas amount Mcegr in the engine steady operation may be calculated either from the EGR control valve passing-through gas flow rate megr in the engine steady operation or from the difference $\Delta KL$ using the above-described equation (4).

Figure 14:
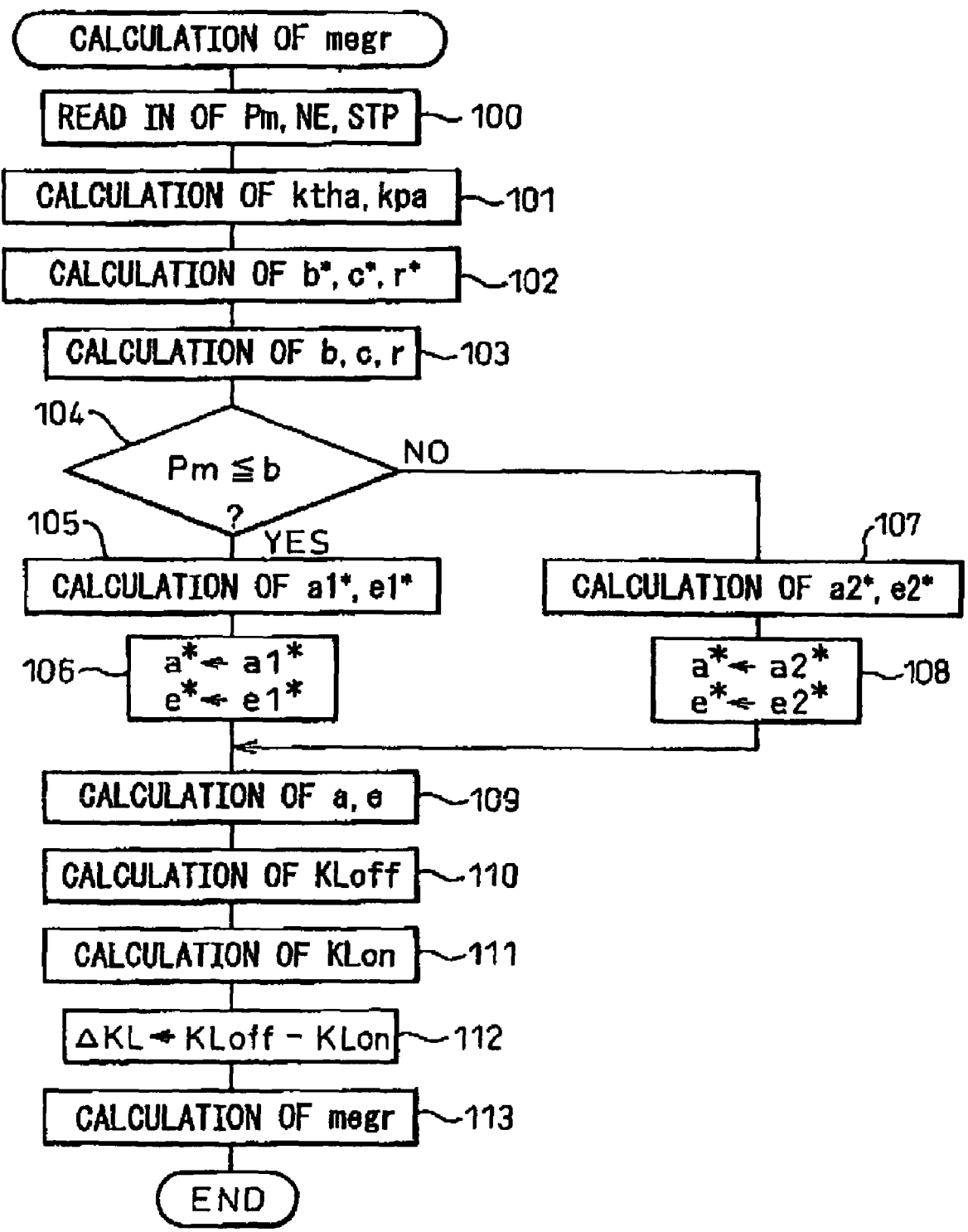
FIG. 14 shows a flowchart illustrating a calculation routine of the EGR control valve passing-through gas flow rate megr.

FIG. 14 shows a calculation routine for the EGR control valve passing-through gas flow rate megr in the above-described embodiment according to the present invention. This routine is executed by interruption every predetermined time.

Referring to FIG. 14, first, in step 100, the intake pipe pressure Pm, the engine speed NE and the opening degree of the EGR control valve STP are read in. In the following step 101, the atmospheric temperature correction coefficient ktha and the atmospheric pressure correction coefficient kpa are calculated. In the following step 102, the intake pipe pressure b* and engine load ratio c* and r* at the connecting point CP under the reference environmental condition are calculated from the maps of FIGS. 7, 8B, and 12. In the following step 103, the parameters b, c and r are calculated by correcting b*, c* and r* using ktha and kpa. In the following step 104, it is judged whether the detected intake pipe pressure Pm is not higher than the intake pipe pressure b at the connecting point. If Pm$\leq$b, the process proceeds to step 105, where a1* and e1* are calculated from the maps of FIGS. 6C and 11A. In the following step 106, the gradients a* and e* are set to a1* and e1*, respectively. Then, the process proceeds to step 109. In contrast, if Pm>b, the process proceeds to step 107, where a2* and e2* are calculated from the maps of FIGS. 6D and 11B. In the following step 108, the gradients a* and e* are set to a2* and e2*, respectively. Then, the process proceeds to step 109.

In the step 109, the parameters a and e are calculated by correcting a* and e* using ktha and kpa. In the following step 110, the engine load ratio KLoff is calculated based on the equation (3) (KLoff=a·(Pm−b)+c). In the following step 111, the engine load ratio KLon is calculated based on the equation (2) (KLon=e·(Pm−b)+r). In the following step 112, the difference $\Delta KL$ is calculated ($\Delta KL$=KLoff−KLon). In the following step 113, the EGR control valve passing-through gas flow rate megr is calculated based on the equation (5) (megr=kegr2·ΔKL).

In the embodiment described above, the engine load ratios KLoff and KLon are expressed with the respective two linear function expressions. However, the engine load ratios KLoff and KLon may also be expressed with respective m-th function expressions of n (n, m=1, 2 . . . )

Thus, it can be said that, in the embodiment described above, the cylinder-charged air amount or the engine load ratio KLoff in the engine steady operation with the EGR gas being not supplied is expressed with a first function expression which is a function expression of the intake pipe pressure Pm and the first function expression is obtained and stored in advance, the cylinder-charged air amount or the engine load ratio KLon in the engine steady operation with the EGR gas being supplied is expressed with a second function expression which is a function expression of the intake pipe pressure Pm and the second function expression is obtained and stored in advance, the cylinder-charged air amounts or the engine load ratios KLoff and KLon are calculated from the intake pipe pressure Pm obtained in advance using the first and second function expressions, respectively, the difference ΔKL between these calculated cylinder-charged air amounts or the engine load ratios KLoff and KLon is calculated and, then, the EGR control valve passing-through gas flow rate megr is calculated based on the difference ΔKL.

In addition, generally speaking, it can be said that the difference ΔKL between the cylinder-charged air amount or the engine load ratio KLoff in the engine steady operation with the EGR gas being not supplied and the cylinder-charged air amount or the engine load ratio KLon in the engine steady operation with the EGR gas being supplied, is expressed with function expressions of the intake pipe pressure Pm, and the function expressions are obtained and stored in advance, the intake pipe pressure Pm is obtained, the difference ΔKL is calculated from the obtained intake pipe pressure Pm using the function expressions and, then, the EGR control valve passing-through gas flow rate megr in the engine steady and transient operations and the cylinder-charged EGR gas amount Mcegr in the engine steady operation are calculated based on the difference ΔKL.

Next, another embodiment according to the present invention will be explained.

The difference ΔKL described above can be explained using the equations (3) and (2) expressing KLoff and KLon, as the following equation:

$$\Delta KL = KLoff - KLon \quad (6)$$
$$= (a-e)\cdot(Pm-b)+(c-r)$$

Here, if substitution (a−e)=h and (c−r)=i are made, the equation (6) will be rewritten as follows:

$$\Delta KL = h\cdot(Pm-b)+i \quad (7)$$

$h=h1 \ldots Pm \leqq b$ $h=h2 \ldots Pm > b$

Therefore, as shown in FIG. 15, the difference ΔKL is expressed with two linear function expressions of the intake pipe pressure Pm having different gradients from each other and continuous with each other at a connecting point CP. More specifically, the difference ΔKL is expressed with one linear function expression with the gradient h1 when the intake pipe pressure Pm is low, and expressed with the other linear function expression with the gradient h2 when the intake pipe pressure Pm is high.

In the embodiment of the present invention, the two linear function expressions of the intake pipe pressure Pm expressing the difference ΔKL are stored in the ROM 32 in the form of the equation (7). This reduces the number of parameters.

The parameters h, b and i in this equation (7) are calculated based on the following equations:

$$h1 = h1^* \cdot ktha$$

$$h2 = h2^* \cdot ktha$$

$$i = i^* \cdot ktha \cdot kpa$$

where $h1^*$ and $h2^*$, and $i^*$ are the gradients and the difference at the connecting point CP, respectively, when the engine environmental condition is the predetermined reference condition. These values $h1^*$, $h2^*$ and $i^*$ are obtained by experiments and stored in the ROM 32, in advance, as a function of the engine speed NE and the opening degree of the EGR control valve STP in the form of maps shown in FIGS. 16A, 16B and 16C, respectively. Here, the parameter b is similar to the one in the embodiment described above and, thus, an explanation therefor is omitted.

Therefore, generally speaking, it can be said that two linear function expressions of the intake pipe pressure Pm expressing the difference ΔKL for different opening degree of the EGR control valve STP are obtained and stored in advance. Further, it can also be said that two linear function expressions of the intake pipe pressure Pm expressing the difference ΔKL for different engine speeds are obtained and stored in advance.

Figure 17:
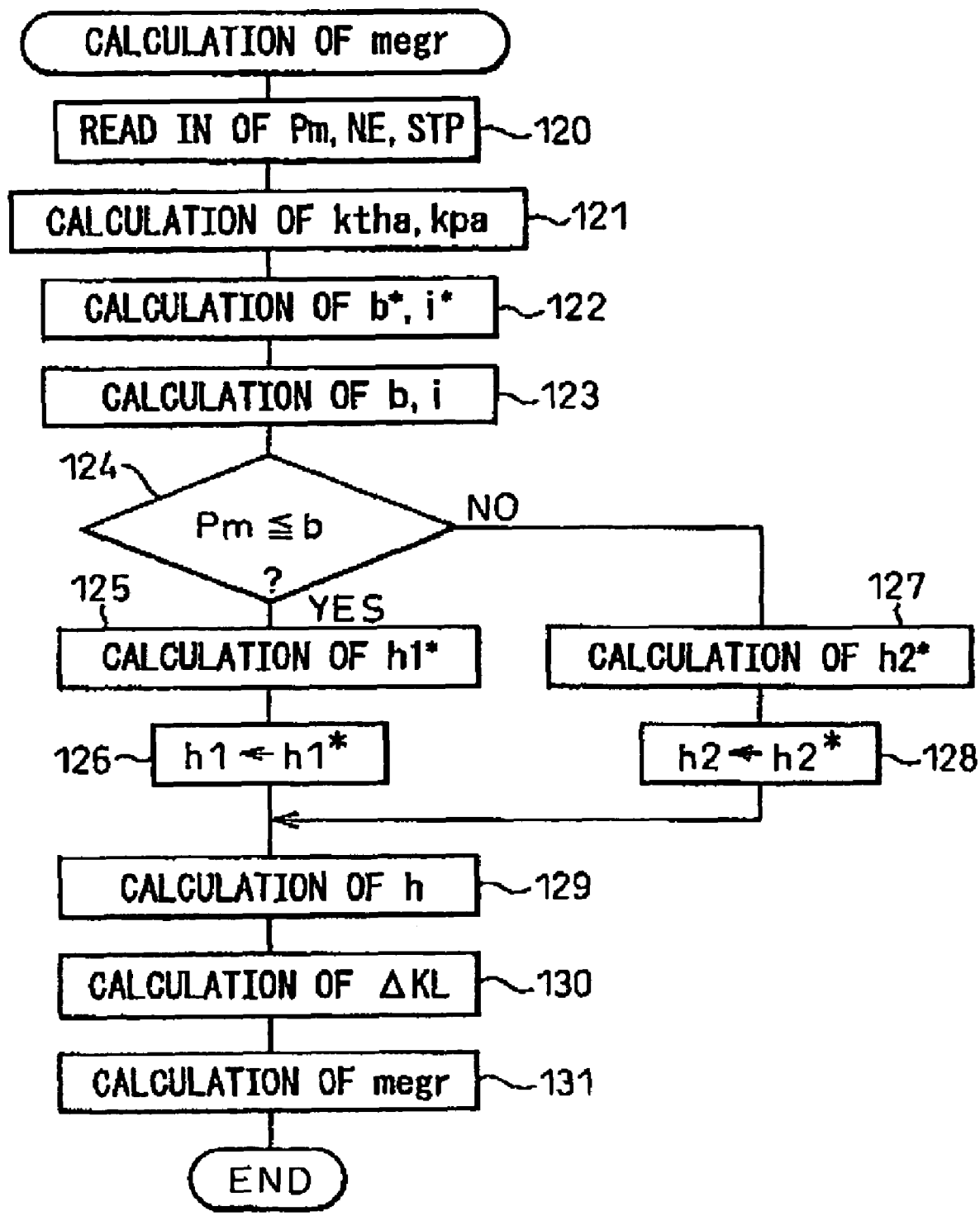
FIG. 17 shows a flowchart illustrating a calculation routine of the EGR control valve passing-through gas flow rate megr according to another embodiment of the present invention.

FIG. 17 shows a calculation routine for the EGR control valve passing-through gas flow rate megr in the above-described alternative embodiment. This routine is executed by interruption every predetermined time.

Referring to FIG. 17, first, in step 120, the intake pipe pressure Pm, the engine speed NE and the opening degree of the EGR control valve STP are read in. In the following step 121, the atmospheric temperature correction coefficient ktha and the atmospheric pressure correction coefficient kpa are calculated. In the following step 122, the intake pipe pressure $b^*$ and the difference $i^*$ at the connecting point CP under the reference environmental condition are calculated from the maps of FIGS. 7 and 16C. In the following step 123, the parameters b and i are calculated by correcting $b^*$ and $i^*$ using ktha and kpa. In the following step 124, it is determined whether the detected intake pipe pressure Pm is not higher than the intake pipe pressure b at the connecting point. Then, if Pm≦b, the process proceeds to step 125, where $h1^*$ is calculated from the map of FIG. 16A. In the following step 126, the gradient $h^*$ is set to $h1^*$. Then, the process proceeds to step 129. In contrast, if Pm>b, the process proceeds to step 127, where $h2^*$ is calculated from the map of FIG. 16B. In the following step 128, the gradient $h^*$ is set to $h2^*$. Then, the process proceeds to step 129.

In the step 129, the parameter h is calculated by correcting $h^*$ using ktha and kpa. In the following step 130, the difference ΔKL is calculated based on the equation (7) (ΔKL=h·(Pm−b)+i). In the following step 131, the EGR control valve passing-through gas flow rate megr is calculated based on the equation (5) (megr=kegr2·ΔKL).

Here, the opening degree of the EGR control valve STP will be explained briefly. As described above, the opening degree of the EGR control valve is represented by the step number STP of the step motor of the EGR control valve 22 and, thus, the EGR control valve 22 is closed as the step number STP becomes zero and the opening degree of the EGR control valve becomes larger as the step number STP becomes larger.

However, in fact, as shown in FIG. 18, even when the step number STP is increased from zero, the EGR control valve 22 is not opened at once, but it is opened only after the step number STP exceeds STP1. Therefore, the opening degree of the EGR control valve must be expressed with the result of subtraction (STP−STP1) of STP1 from the step number STP.

Further, as there is typically a manufacturing error in the EGR control valve 22, the actual opening degree of the EGR control valve expressed by the step number STP may deviate from a proper opening degree. Therefore, in the internal combustion engine shown in FIG. 1, a correction coefficient kg for making the actual opening degree of the EGR control valve equal to the proper opening degree is obtained, and is added to the step number STP.

Therefore, the opening degree of the EGR control valve STP will be expressed with the following equation:

$$STP=STP-STP0+kg$$

where STP0 is a step number at which an EGR control valve 22 having a central value of dimensional tolerance begins opening. In the embodiment according to the present invention, the opening degree of the EGR control valve STP thus calculated is used as an argument for the maps.

In this connection, the EGR control valve passing-through gas flow rate megr or the cylinder-charged EGR gas amount Mcegr in the engine steady operation calculated as described above may be further corrected in consideration of the exhaust temperature Te.

An explanation for a case in which the EGR control valve passing-through gas flow rate megr is corrected will now be given. The EGR control valve passing-through gas flow rate megr in this case is expressed with the following equation, for example:

$$megr=megr \cdot kwu \cdot krtd \cdot kinc$$

where kwu, krtd and kinc represent a correction coefficient at the time of warming-up, a correction coefficient at the time of retardation, and a correction coefficient at the time of increase of fuel supply amount, respectively.

The correction coefficient at the time of warming-up is intended to correct the EGR control valve passing-through gas flow rate megr when the warming-up is in process. The exhaust temperature Te when the warming-up is in process is lower than that when it is completed and, thus, the EGR control valve passing-through gas flow rate megr (g/sec) increases accordingly. The EGR control valve passing-through gas flow rate megr calculated using the above-described equation (2), (3) or (7) is the value when the warming-up operation is completed and, therefore, it must be corrected.

Figure 19A:
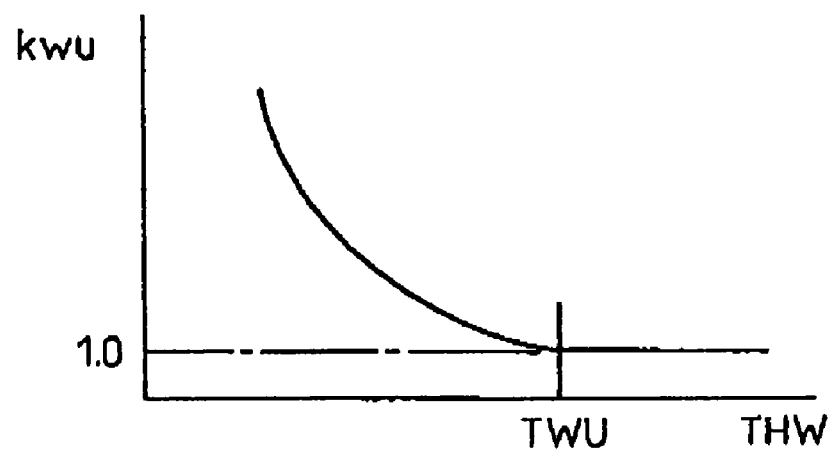
FIGS. 19A through 19C show diagrams illustrating various correction coefficients, respectively.

As shown in FIG. 19A, the correction coefficient at the time of warming-up kwu becomes smaller as an engine coolant temperature THW representing the extent of warming-up becomes higher, and is maintained at 1.0 after the engine coolant temperature THW becomes equal to or be higher than a temperature TWU representing the completion of warming-up. This correction coefficient at the time of warming-up kwu is stored in the ROM 32 in advance in the form of a map shown in FIG. 19A.

On the other hand, the correction coefficient at the time of retardation krtd is intended to correct the EGR control valve passing-through gas flow rate megr when a retardation correction of the ignition timing is in process. The exhaust temperature Te when the retardation correction is in process is higher than that when it is not in process and, thus, the EGR control valve passing-through gas flow rate megr is reduced accordingly.

Figure 19B:
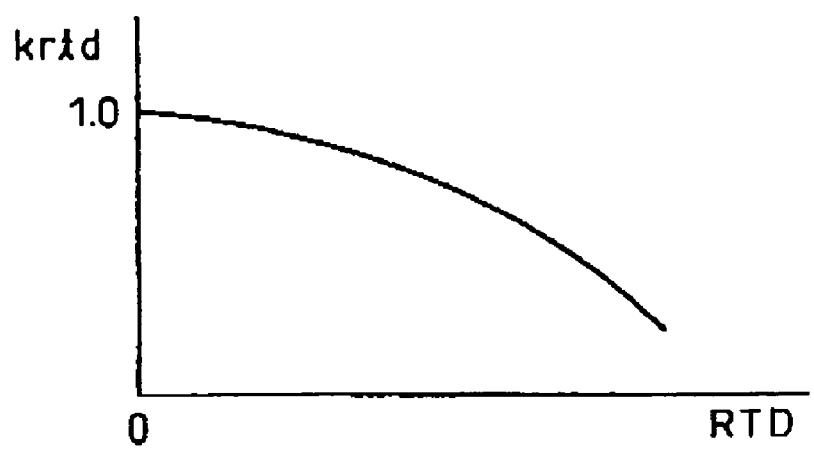

As shown in FIG. 19B, the correction coefficient at the time of retardation krtd is set to 1.0 when the retardation amount RTD is zero, and becomes smaller as the retardation amount RTD becomes larger. This correction coefficient at the time of retardation krtd is stored in the ROM 32 in advance in the form of a map shown in FIG. 19B.

Further, the correction coefficient at the time of increase of fuel supply amount kinc is intended to correct the EGR control valve passing-through gas flow rate megr when an increasing correction of fuel supply amount is in process. The exhaust temperature Te when the increasing correction of fuel supply amount is in process is lower than that when it is not in process and, thus, the EGR control valve passing-through gas flow rate megr increases accordingly.

Figure 19C:
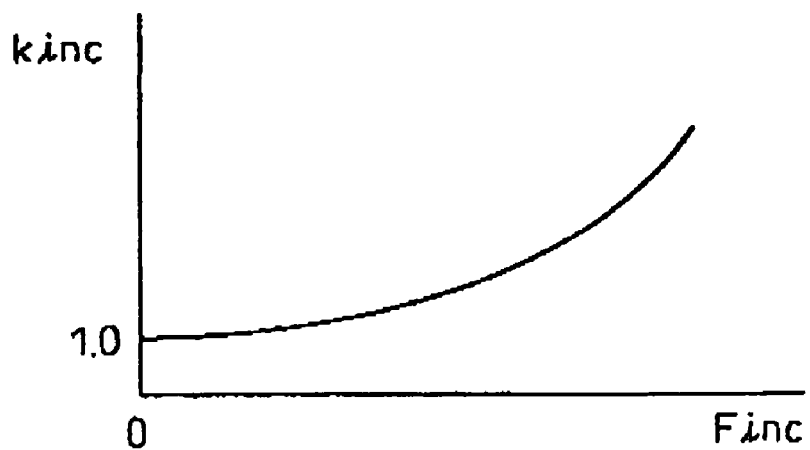

As shown in FIG. 19C, the correction coefficient at the time of increase of fuel supply amount kinc is set to 1.0 when the increasing correction amount Finc is zero, and becomes smaller as the increasing correction amount Finc becomes larger. This correction coefficient at the time of increase of fuel supply amount kinc is stored in the RON 32 in advance in the form of a map shown in FIG. 19C.

This allows that the EGR control valve passing-through gas flow rate megr is calculated with higher accuracy.

Alternatively, the exhaust temperature Te when the retardation correction of ignition timing or the increasing correction of fuel supply amount is not in process may be obtained in advance as a function of the engine operating condition such as the engine speed NE and the required load L, the actual exhaust temperature Te may be detected or estimated and, then, the EGR control valve passing-through gas flow rate megr may be corrected based on the difference between the exhaust temperature Te when the retardation correction of ignition timing or the increasing correction of fuel supply amount is not in process and the actual exhaust temperature Te. The same may be applied to the cylinder-charged EGR gas amount Mcegr in the engine steady operation and, thus, an explanation therefor is omitted.

Figure 20:
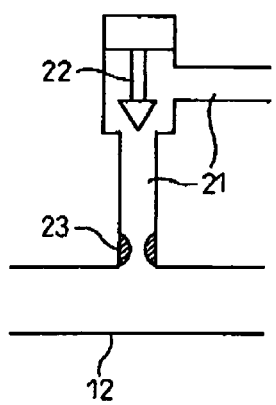
FIG. 20 shows a partial view of an internal combustion engine illustrating yet another embodiment of the present invention.

In the internal combustion engine shown in FIG. 1, as described above, the EGR supply pipe 21 downstream of the EGR control valve 22 is forked into the branches connected to the respective intake branches 12. In this configuration, in order to suppress unevenness of the amount of the EGR gas supplied to each cylinder, a choke 23 may be provided in each of the branches of the EGR supply pipe 21, as shown in FIG. 20.

In this case, first, in the engine steady operation, a choke passing-through gas flow rate mchk (g/sec), which is an amount of the EGR gas passing through the chokes 23, coincides with the EGR control valve passing-through gas flow rate megr. Therefore, as understood from the foregoing description, the choke passing-through gas flow rate mchk in the engine steady operation can be calculated based on the difference ΔKL. Note that the choke passing-through gas flow rate mchk represents a flow rate of the EGR gas flowing into the intake pipe.

On the other hand, in the engine transient operation, the choke passing-through gas flow rate mchk does not always coincide with the EGR control valve passing-through gas flow rate megr. However, when an internal volume of the EGR supply pipe 21 from the EGR control valve 22 to the chokes 23 is relatively small, mchk substantially coincides with megr. Therefore, when the internal volume of the EGR supply pipe 21 from the EGR control valve 22 to the chokes 23 is relatively small, the choke passing-through gas flow rate mckh can be calculated based on the difference ΔKL, either in the engine steady or transient operation.

Figure 21A:
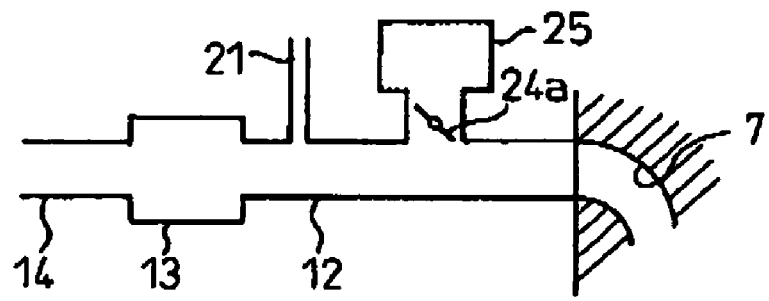
FIGS. 21A through 21C show partial views of different internal combustion engines to which the present invention can be applied.
Figure 21B:
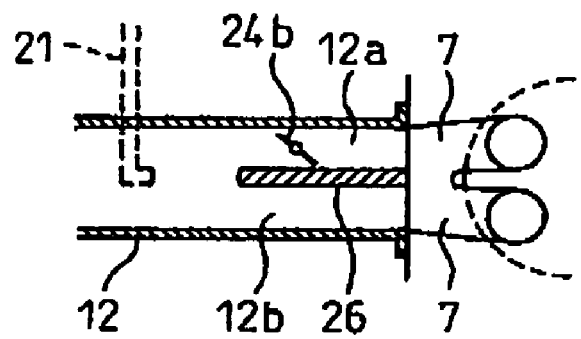
Figure 21C:
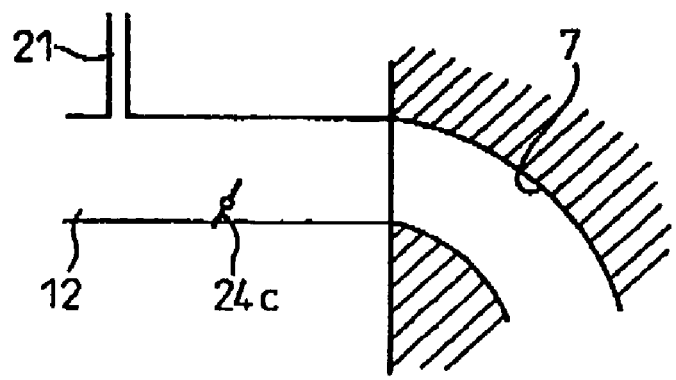

FIGS. 21A, 21B and 21C show different internal combustion engines to which the present invention can be applied.

In an internal combustion engine shown in FIG. 21A, additional surge tanks 25 are connected to the intake branches 12 of each cylinder via respective intake pipe length control valves 24a.

The intake pipe length control valves 24a are closed when the engine speed is low, and are opened when the engine speed is high, for example. When the intake pipe length control valves 24a are closed, communication between the intake branches 12 and the additional surge tanks 25 is blocked to extend the effective length of the intake pipe. In contrast, when the intake pipe length control valves 24a are opened, the intake branches 12 and the additional surge tanks 25 are communicated with each other to shorten the effective length of the intake pipe. As a result, an efficient intake air pulsation is achieved, irrespective of the engine speed NE.

On the other hand, in an internal combustion engine shown in FIG. 21B, each of the intake branches 12 of the cylinders is provided with a respective pair of intake passages 12a and 12b therein separated by a respective partition wall 26, and each of the intake passages 12a and 12b is connected to the respective intake port 7. A swirl control valve 24b is disposed in one intake passage 12a of the pair of the intake passages 12a and 12b.

The swirl control valves 24b are closed when the engine load is low, and are opened when the engine load is high, for example. When the swirl control valves 24b are closed, the gas mixture flows into the cylinder only from the other intake passage 12b to create a swirl in the cylinder about the cylinder axis. In contrast, when the swirl control valves 24b are opened, the gas mixture flows into the cylinder from both intake passages 12a and 12b and, thus, a sufficient amount of fresh air is supplied to the cylinder.

In an internal combustion engine shown in FIG. 21C, a tumble control valve 24c is disposed at the bottom of internal space of each intake branch 12 of the cylinder.

The tumble control valves 24c are closed when the engine load is low, and are opened when the engine load is high, for example. When the tumble control valves 24c are closed, the gas mixture proceeds along the top of the internal wall of the intake branch 12, flows in the cylinder through a portion at the side of the exhaust valve 8 of the opening formed around the intake valve 7, falls down along the internal wall of the cylinder bore beneath the intake valve 8, proceeds on the top surface of the piston and, then, ascends along the internal wall of the cylinder bore beneath the intake valve 7, to create a swirl or tumble flow in the cylinder. In contrast, when the tumble control valves 24c are opened, the gas mixture flows in the cylinder through the entire intake branch 12 and, thus, a sufficient amount of fresh air is supplied to the cylinder.

If a device controlling the air flow in the intake pipe, such as the intake pipe length control valve 24a, the swirl control valve 24b and the tumble control valve 24c, is referred to as an intake control valve, the engine load ratio KL may vary depending on whether the intake control valve is closed or opened.

Therefore, in each internal combustion engine shown in FIGS. 21A through 21C, maps representing the parameters a*, b*, c*, e*, r*, h* and i* when the intake control valve is closed and maps representing these parameters when the intake control valve is opened are obtained and stored, in advance, and the parameters may be calculated from either map depending on the condition of the intake control valve.

When the opening degree of the intake control valve is controlled in a multi-step manner, each parameter may be set as a function of the opening degree of the intake control valve. More specifically, with regard to the parameter a*, for example, a* may be stored as a function of the engine speed NE, the opening degree of the EGR control valve STP and the opening degree of the intake control valve in the form of a three-dimensional map. The same can be applied to the other parameters.

Therefore, generally speaking, it can be said that a linear function expression of the intake pipe pressure Pm expressing the engine load ratios KLon and KLoff or the difference ΔKL for different opening degrees of the intake control valve are obtained and stored in advance.

In this way, in each internal combustion engine shown in FIGS. 21A through 21C, each parameter is calculated using the map for the intake control valve being closed when the intake control valve is closed, and using the map for the intake control valve being opened when the intake control valve is opened and, therefore, the engine load ratios KLon or KLoff or the difference ΔKL is calculated accurately.

However, in the internal combustion engine of FIG. 21B, for example, the swirl flow is not created soon after the swirl control valve 24b is closed, but is created gradually with the elapse of time. This means that the engine load ratios KLon and KLoff or the difference ΔKL cannot always be calculated accurately even if the map used for calculating the parameter is switched in response to the switching of the swirl control valve 24b from the closed state to the opened state. The same can be applied to a case when the swirl control valve is turned open.

Therefore, it is preferable to change each parameter gradually with a predetermined changing rate, from the value calculated using the map for the condition of the intake control valve before the switching, to that calculated using the map for the condition of the intake control valve after the switching. Accordingly, this allows that the engine load ratios KLon and KLoff or the difference ΔKL is calculated accurately even during the switching of the intake control valve. Further, the changing rate when the intake control valve is switched from the closed state to the opened state and that when it is switched from the opened state to the closed state, may be different from each other.

In the embodiments according to the present invention described above, the engine load ratios KLon and KLoff or the difference ΔKL are calculated from the intake pipe pressure Pm detected by the pressure sensor 39. Alternatively, the intake pipe pressure Pm may be estimated based on the opening degree of the throttle valve or an output of an air flow meter disposed in the intake duct 14 upstream of the throttle valve 17, for example, and the engine load ratio KL may be calculated from the estimated intake pipe pressure Pm. Further alternatively, the intake pipe pressure Pm may be estimated using a computation model, for example, and the engine load ratio KL may be calculated from the estimated intake pipe pressure Pm.

When the intake pipe pressure Pm is estimated based on the opening degree of the throttle valve, the intake pipe pressure Pm is obtained in advance as a function of the opening degree of the throttle valve, the engine speed NE and the opening degree of the EGR control valve STP, and is stored in the form of a map.

The thus obtained Pm is read in in step 100 shown in FIG. 14 or in step 120 shown in FIG. 17.

On the other hand, if the intake pipe pressure Pm is estimated based on the output of the air flow meter, the estimated intake pipe pressure Pm may exceed the maximum pressure Pmmax which the intake pipe pressure Pm can accept, due to detection accuracy of the air flow meter or the like. However, as shown in FIG. 22D, in the range of Pm>Pmmax, the engine load ratio KLon expressed with the above-described equation (2) may be larger than the engine load ratio KLoff expressed with the equation (3) and, in this case, the difference ΔKL will be a negative value. Thus, if the estimated intake pipe pressure Pm exceeds the maximum pressure Pmmax, the difference ΔKL may not be calculated accurately.

Figure 22A:
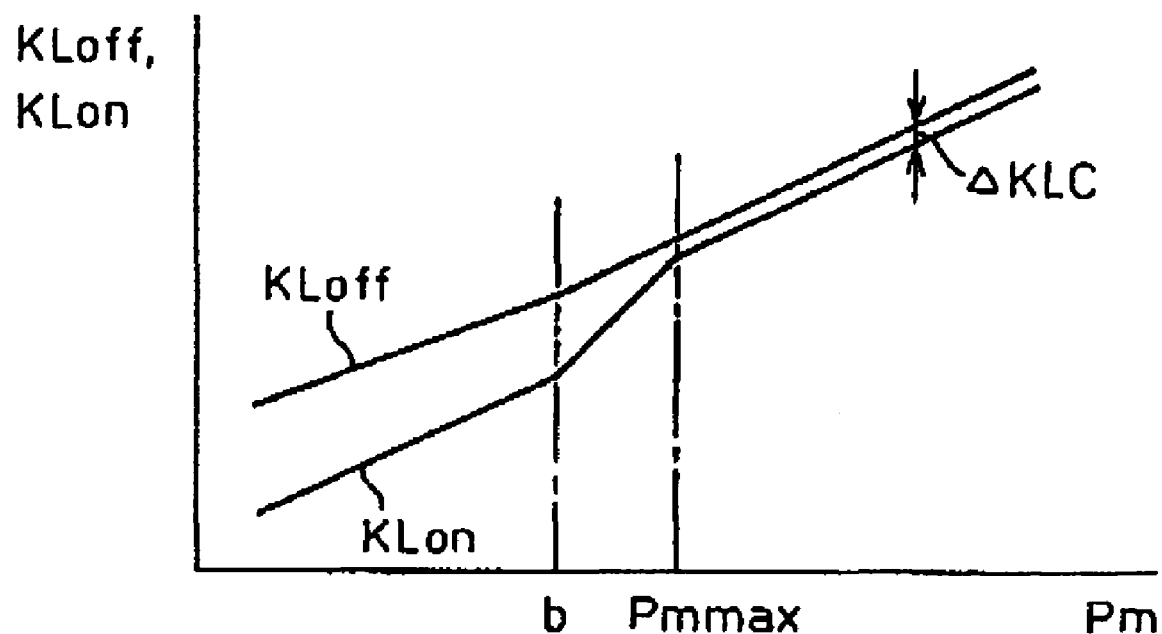
FIGS. 22A and 22B show diagrams illustrating another embodiment of the present invention.

Accordingly, as shown in FIG. 22A, in the range of Pm>Pmmax, maintaining of the difference ΔKL at a constant value ΔKLC, will eliminate such a problem. Namely, the difference ΔKL can still be calculated accurately when the estimated intake pipe pressure Pm exceeds the maximum pressure Pmmax.

Figure 22B:
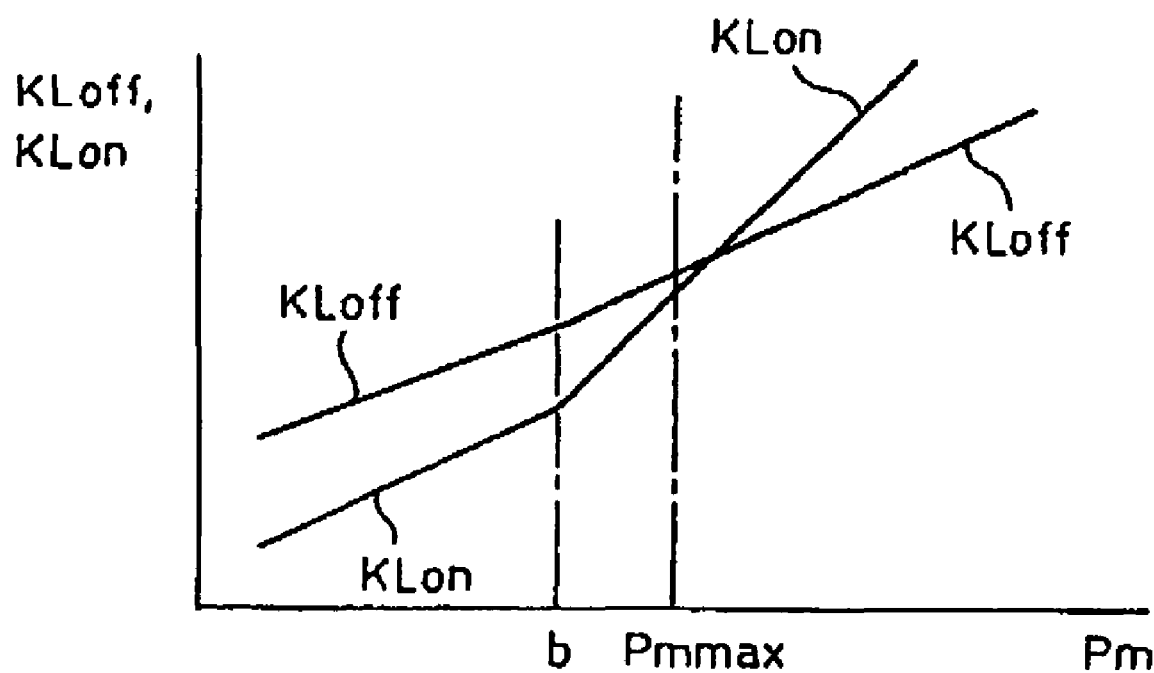
Figure 23:
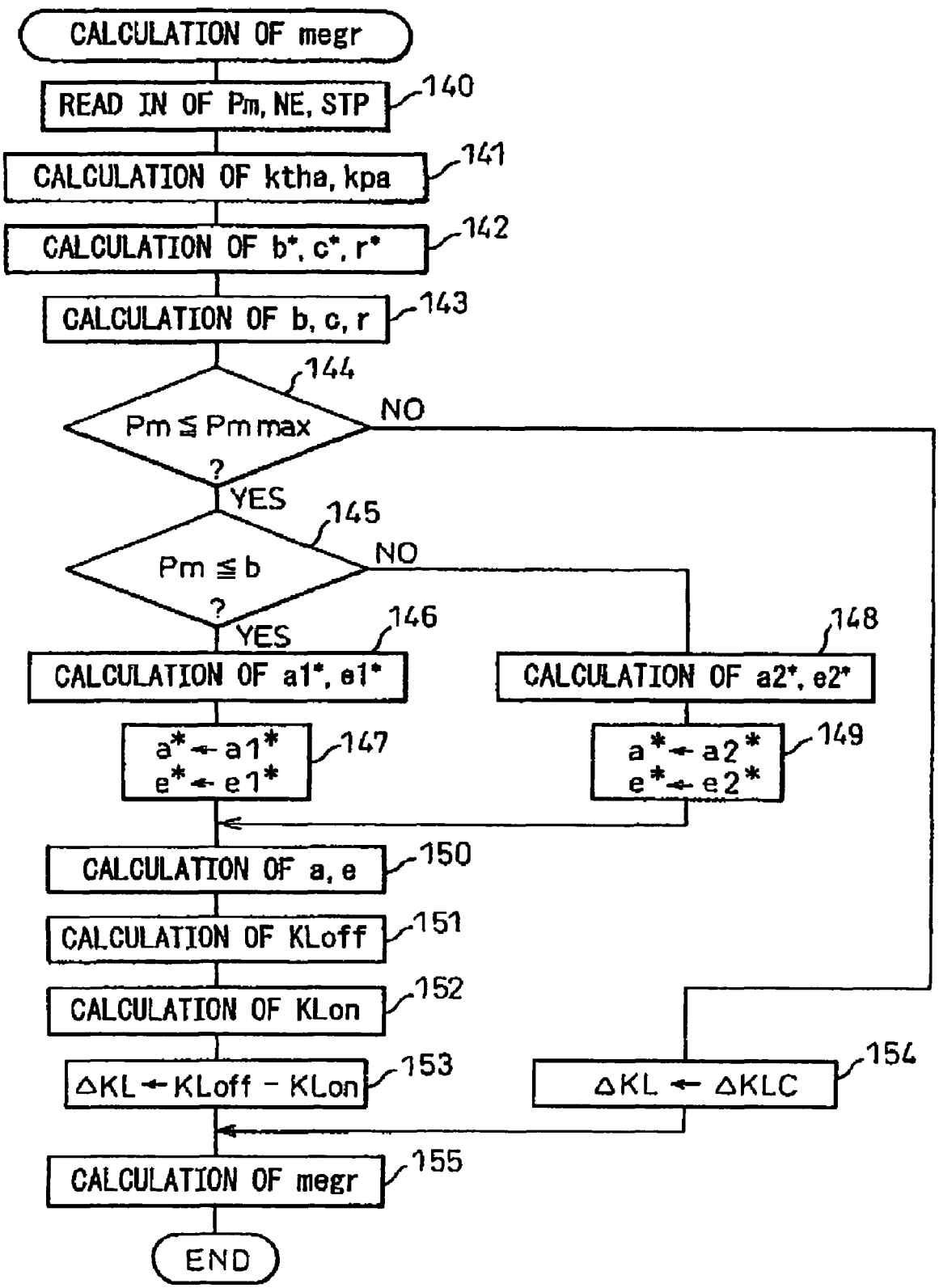
FIG. 23 shows a flowchart illustrating a calculation routine of The EGR control valve passing-through gas flow rate megr according to another embodiment of the present invention.

FIG. 23 shows a calculation routine for the EGR control valve passing-through gas flow rate megr according to the embodiment explained referring to FIGS. 22A and 22B. This routine is executed by interruption every predetermined time.

Referring to FIG. 23, first, in step 140, the intake pipe pressure Pm, the engine speed NE and the opening degree of the EGR control valve STP are read in. In the following step 141, the atmospheric temperature correction coefficient ktha and the atmospheric pressure correction coefficient kpa are calculated. In the following step 142, the intake pipe pressure b* and engine load ratio c* and r* at the connecting point CP under the reference environmental condition are calculated from the maps of FIGS. 7, 8B, and 12. In the following step 143, the parameters b, c and r are calculated by correcting b*, c* and r* using ktha and kpa. In the following step 144, it is judged whether the obtained intake pipe pressure Pm is not higher than the maximum pressure Pmmax. If Pm≦Pmmax, the process proceeds to step 145, where it is judged whether the obtained intake pipe pressure Pm is not higher than the intake pipe pressure b at the connecting point. If Pm≦b, the process proceeds to step 146, where a1* and e1* are calculated from the maps of FIGS. 6C and 11A. In the following step 147, the gradients a* and e* are set to a1* and e1*, respectively. Then, the process proceeds to step 150. In contrast, if Pm>b in step 145, the process proceeds to step 148, where a2* and e2* are calculated from the maps of FIGS. 6D and 11B. In the following step 149, the gradients a* and e* are set to a2* and e2*, respectively. Then, the process proceeds to step 150.

In the step 150, the parameters a and e are calculated by correcting a* and e* using ktha and kpa. In the following step 151, the engine load ratio KLoff is calculated based on the equation (3) (KLoff=a·(Pm−b)+c). In the following step 152, the engine load ratio KLon is calculated based on the equation (2) (KLon=e·(Pm−b)+r). In the following step 153, the difference ΔKL is calculated (ΔKL=KLoff−KLon). Then, the process proceeds to step 155.

If Pm>Pmmax in step 144, the process proceeds to step 154, where the difference is set to the constant ΔKLC and, then, the process proceeds to step 155.

In step 155, the EGR control valve passing-through gas flow rate megr is calculated based on the equation (5) (megr=kegr2·ΔKL).

According to the present invention, it is possible to provide an apparatus for calculating an amount of a recirculated exhaust gas for an internal combustion engine which can obtain the exhaust gas recirculation control valve passing-through gas amount, simply and accurately.

While the invention has been described by reference to specific embodiments chosen for purposes of illustration, it should be apparent that numerous modifications could be made thereto by those skilled in the art without departing from the basic concept and scope of the invention.

The invention claimed is:

1. An apparatus for calculating an amount of a recirculated exhaust gas for an internal combustion engine, the engine having an intake pipe and an exhaust pipe, the intake pipe downstream of an throttle valve and the exhaust pipe being connected with each other via an exhaust gas recirculation passage, and an exhaust gas recirculation control valve for controlling an amount of recirculated exhaust gas flowing through the exhaust gas recirculation passage being disposed in the exhaust gas recirculation passage, the apparatus comprising:

means for expressing a difference between a cylinder-charged air amount in an engine steady operation with the recirculated exhaust gas being not supplied, and the cylinder-charged air amount in the engine steady operation with the recirculated exhaust gas being supplied, with a function expression of an intake pipe pressure, and for obtaining and storing the function expression in advance, the cylinder-charged air amount being an amount of fresh air charged in a cylinder, and the intake pipe pressure being a pressure in the intake pipe downstream of the throttle valve;

means for obtaining the intake pipe pressure; and means for calculating the difference from the obtained intake pipe pressure using the function expression, and for calculating an exhaust gas recirculation control valve passing-through gas amount, which is an amount of the recirculated exhaust gas passing through the exhaust gas recirculation control valve when the exhaust gas recirculation control valve is opened, based on the difference.

2. An apparatus according to claim 1, wherein the intake pipe pressure in the engine steady operation is obtained, wherein the difference is calculated from the obtained intake pipe pressure using the function expression, and wherein an amount of the recirculated exhaust gas charged in the cylinder in the engine steady operation is calculated based on the difference.

3. An apparatus according to claim 1, wherein the cylinder-charged air amount in the engine steady operation with the recirculated exhaust gas being not supplied is expressed with a first function expression of the intake pipe pressure, and the first function expression is obtained and stored in advance, and the cylinder-charged air amount in the engine steady operation with the recirculated exhaust gas being supplied is expressed with a second function expression of the intake pipe pressure, and the second function expression is obtained and stored in advance, wherein the cylinder-charged air amounts are respectively calculated from the obtained intake pipe pressure using the first and second function expressions, wherein a difference between these calculated cylinder-charged air amounts is calculated, and wherein the exhaust gas recirculation control valve passing-through gas amount is calculated based on the difference.

4. An apparatus according to claim 1, wherein the respective function expressions are obtained and stored in advance for different opening degrees of the exhaust gas recirculation control valve, wherein the opening degree of the exhaust gas recirculation control valve is obtained, and wherein the difference is calculated using the function expression determined in accordance with the obtained opening degree of the exhaust gas recirculation control valve.

5. An apparatus according to claim 1, wherein the respective function expressions are obtained and stored in advance for different engine speeds, wherein the engine speed is obtained, and wherein the difference is calculated using the function expression determined in accordance with the obtained engine speed.

6. An apparatus according to claim 1, wherein the function expression comprises two linear function expressions having different gradients from each other and are continuous with each other at a connecting point.

7. An apparatus according to claim 3, wherein each of the first and second function expressions comprises two linear function expressions having different gradients from each other and being continuous with each other at a respective connecting point.

8. An apparatus according to claim 1, the engine having a plurality of cylinders connected to respective intake branches, wherein the exhaust gas recirculation passage downstream of the exhaust gas recirculation control valve is forked into branches connected to the respective intake branches, wherein chokes are provided in the branches of the exhaust gas recirculation passage, wherein an amount of the recirculated exhaust gas passing through the respective chokes and flowing into the respective intake branches is calculated based on the difference.

9. An apparatus according to claim 1, wherein an intake control valve is provided for controlling an air flow in the intake pipe downstream of the throttle valve, wherein the respective function expressions are obtained and stored in advance for different opening degrees of the intake control valve, wherein the opening degree of the intake control valve is obtained, and wherein the difference is calculated using the function expression determined in accordance with the obtained opening degree of the intake control valve.

10. An apparatus according to claim 9, wherein the intake control valve comprises an intake pipe length control valve for controlling the effective length of the intake pipe.

11. An apparatus according to claim 9, wherein the intake control valve comprises a swirl or tumble control valve for controlling formation of a swirl or tumble flow in the cylinder.

12. An apparatus according to claim 9, wherein at least one parameter defining the function expression is changed gradually when the opening degree of the intake control valve is changed.

13. An apparatus according to claim 1, wherein the function expression expresses the difference when an engine environmental condition is a predetermined reference environmental condition, wherein a representative value representing the engine environmental condition is obtained, and wherein the difference calculated using the function expression, or the exhaust gas recirculation control valve passing-through gas amount, is corrected based on the representative value.

14. An apparatus according to claim 1, wherein an engine coolant temperature is obtained, and wherein the difference or the exhaust gas recirculation control valve passing-through gas amount is corrected based on the engine coolant temperature.

15. An apparatus according to claim 1, the internal combustion engine having an ignition plug, wherein when a retardation correction of ignition timing is performed, the difference or the exhaust gas recirculation control valve passing-through gas amount is corrected based on an amount of the retardation correction of the ignition timing.

16. An apparatus according to claim 1, wherein when increasing correction of the fuel supply amount is performed, the difference or the exhaust gas recirculation control valve passing-through gas amount is corrected based on an amount of the increasing correction of the fuel supply amount.

17. An apparatus according to claim 1, wherein the intake pipe pressure is detected by a pressure sensor disposed in the intake pipe downstream of the throttle valve, and wherein the difference is calculated from the detected intake pipe pressure using the function expression.

18. An apparatus according to claim 1, wherein an opening degree of the throttle valve is obtained, wherein the intake pipe pressure is estimated based on the obtained opening degree of the throttle valve, and wherein the difference is calculated from the estimated intake pipe pressure using the function expression.

19. An apparatus according to claim 1, wherein an amount of fresh air flowing through the intake pipe is detected by an air flow meter, wherein the intake pipe pressure is estimated based on the detected amount of the fresh air, and wherein the difference is calculated from the estimated intake pipe pressure using the function expression.

20. An apparatus according to claim 19, wherein the difference is maintained at a predetermined constant value when the estimated intake pipe pressure exceeds the maximum pressure.

* * * * *